United States Patent [19]

Owens et al.

[11] 4,173,015
[45] Oct. 30, 1979

[54] SYSTEM AND METHOD FOR CHARACTER PRESENCE DETECTION

[75] Inventors: Charles D. Owens, Allen; Leon H. Bourek, Richardson; Johnnie C. Sikes, Jr., Arlington, all of Tex.

[73] Assignee: Recognition Equipment Incorporated, Dallas, Tex.

[21] Appl. No.: 934,232

[22] Filed: Aug. 16, 1978

[51] Int. Cl.² .............................................. G06K 9/04
[52] U.S. Cl. .................... 340/146.3 H; 340/146.3 SG
[58] Field of Search .............. 340/146.3 H, 146.3 SG, 340/146.3 Y, 146.3 D

[56] References Cited

U.S. PATENT DOCUMENTS

| | | | |
|---|---|---|---|
| 3,273,123 | 9/1966 | Lowitz | 340/146.3 H |
| 3,305,832 | 2/1967 | Griffin et al. | 340/146.3 SG |
| 3,346,845 | 10/1967 | Fomenko | 340/146.3 Y |
| 3,501,623 | 3/1970 | Robinson | 340/146.3 D |
| 3,526,876 | 9/1970 | Baumgartner et al. | 340/146.3 SG |
| 3,613,081 | 10/1971 | Morimoto | 340/146.3 H |

*Primary Examiner*—Leo H. Boudreau
*Attorney, Agent, or Firm*—John E. Vandigriff

[57] ABSTRACT

A system and method for character presence detection having the capability of locating characters within a line of characters represented by a binary stream of data bits. The stream of binary data bits is divided into scans which correspond to scans of a photocell array. The system for character presence detection receives the binary stream. Each data bit has a unique position within its particular scan, which corresponds to the selection of a particular photocell of the photocell array as the output thereof, and, therefore, the binary stream of data bits comprises an image corresponding to alphanumeric characters disposed upon a written medium. That is, the data bits comprise an image of characters which form a line disposed along a written medium. Within the binary stream, some data bits represent character information and the remainder represents background information. The system compares each scan to a plurality of criterion, each criterion being unique, and forms a series of character segments and spaces based on the results of the comparison of each scan to each of the criterion. The character segments and spaces of one series formed by one of the criterion is selected based on the average number of data bits which contain character information per scan. A recycle number is calculated based on the average number of data bits containing character information per scan, the average scans per character segment, and the standard deviation of the scans comprising the character segments. The recycle number is compared against the character segment which form combined character segments by combining adjacent character segments and the space there between if the combined character is comprised of a number of scans which is less than the recycle number. A new recycle number is calculated based on the combined character segments and this new recycle number is utilized to form new combined character segments from the original character segments. This process continues until the recycle number newly calculated is the same as the prior recycle number calculated. The final combined character segments formed by application of the recycle number are tested against certain limits to detect character segments which were improperly combined. The standard deviation calculated which is based on the combined character segments and the average number of scans per combined character segment is utilized to calculate a suspect character width and minimum and maximum natural break numbers.

19 Claims, 22 Drawing Figures

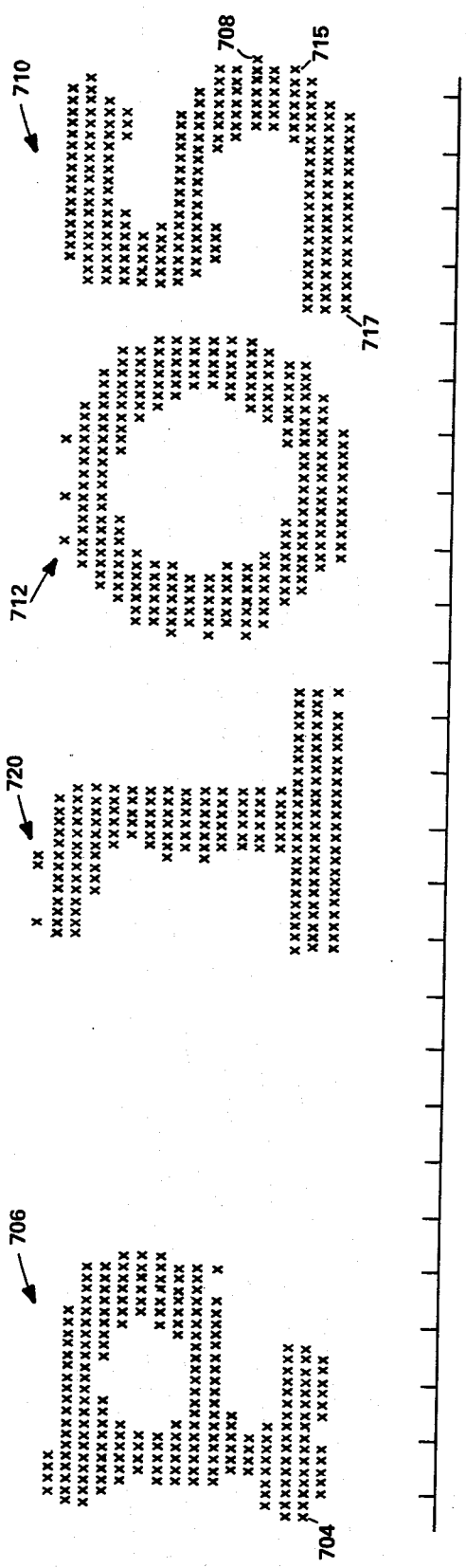
FIG. 12
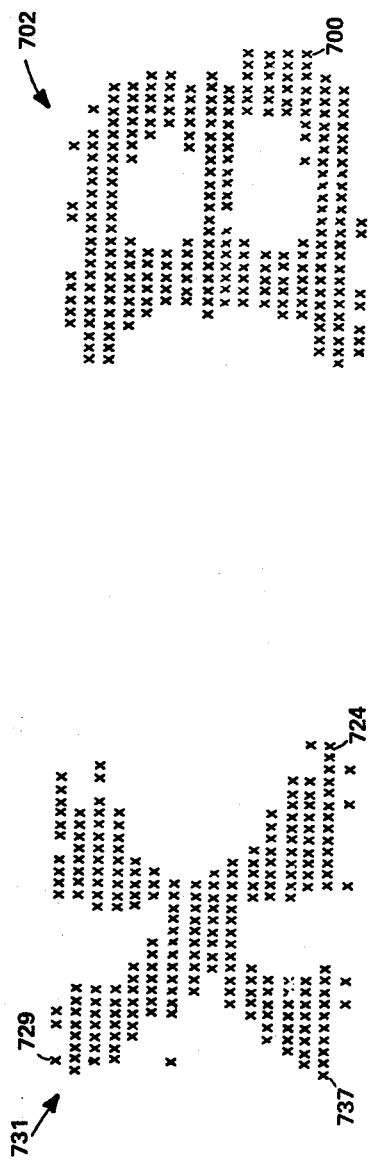
FIG. 11
FIG. 13

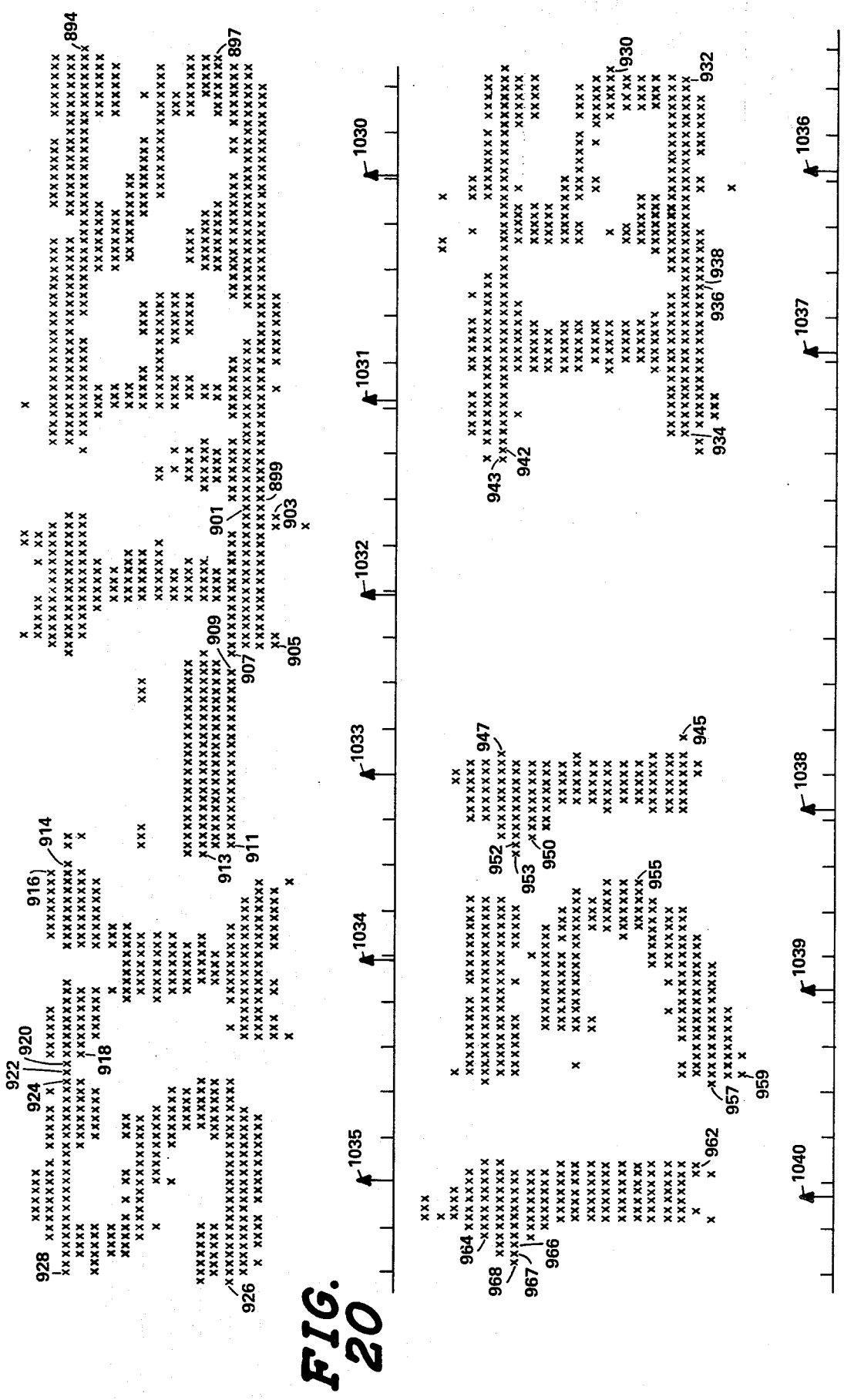

SYSTEM AND METHOD FOR CHARACTER PRESENCE DETECTION

BACKGROUND OF THE INVENTION

1. Field of the Invention

The invention relates to character presence detection systems within character recognition systems; and, more particularly, to character presence detection systems which operate to locate characters within a line of characters.

2. Description of the Prior Art

Reference is made to U.S. Pat. No. 4,013,999 issued to Erwin et al on Mar. 22, 1977 and entitled "Single Read Station Acquisition For Character Recognition". The Erwin patent shows and describes a line finding technique for utilization with a single read station for minimizing the amount of video which is required to be stored. Although the Erwin patent does show line finding, it does not show character presence detection.

Character presence detection is accomplished by the recognition unit as shown in U.S. Pat. No. 3,761,876 issued to Flaherty and Hale on Sept. 25, 1973 and entitled "Recognition Unit For Optical Character Reading System". The system shown in the Flaherty patent is that character presence is determined by observation of the output of a plurality of masks. The outputs of the masks are monitored for the output having the largest amplitude over a number of attempts at character recognition during which the data being provided to the mask is shifted.

It is also known in the art to divide lines of data into character segments based on the assumption that all the characters are of the same width. That is, the length of the line is divided by some predetermined number which is equal to the number of characters assumed to be present in line. Although this particular method of character presence detection is useful, it does not lend itself to situations where the character width is variable and some of the characters may be overlapping, touching, and smudged characters.

None of the prior constructions known in the art shows a method and system for character detection which is capable of detecting characters within a line of characters represented by a serial data stream by utilizing iteration process to determine which characters should be combined and based on the results of certain criterion which are applied to each scan of the data stream. Further, none of the prior constructions shows a method and system for character detection which utilizes certain derived numbers which are utilized to test the characters combined during the iteration process to determine if any of the characters are too large and should be divided. Also, none of the prior constructions show a method and system for character detection for finding characters within a line which locates voids between words and distinguishes from gaps between characters.

SUMMARY OF THE INVENTION

The method and system for character presence detection disclosed herein receives a binary stream of data bits. Each binary data bit represents either character information or background information which corresponds to characters upon a written medium to form an electronic image thereof. The data stream is formed by scanning the written medium, for example, by a self-scanning photocell array. The binary stream contains one line of characters and is divided into scans. Each cell of the photocell array is selected and transformed into a single data bit which indicates the presence of either character information or background information. If the written medium contains multiple lines of characters, the lines are stored and only one line at a time is presented to the system for character presence detection.

Each scan of the binary stream is examined by plurality of detectors which apply certain criterion. For example, one detector could examine each scan and determine if two of any six adjacent data bits contain character information. The detectors are connected to segment generators which accumulate the consecutive number of scans which meet the criterion and the consecutive number of scans which do not. A counter accumulates the total number of data bits which contain character information present in the data stream for the entire line. The number of scans within the binary data stream are also counted. An end of line indicator monitors the data stream for signals therein indicating that a line has indeed ended. A zero scan detector is provided within the system for identifying and signalling the occurrence of scans within which none of the data bits contain character information. A sneak through detector also receives the binary stream of data and signals the absence of when any position containing character information for a predetermined number of consecutive scans. The outputs of the zero scan detector and the sneak through detector are utilized by the segment generators to form character segments and spaces and to indicate when certain inhibit rules should be applied during the combined character operation in connection with the recycle operation.

The outputs of the segment generators are stored in memories to be utilized by a processor. The outputs are also stored within storage units for utilization by an arithmetic unit which computes the recycle number. All the memories and storage units could be one common memory. The recycle number is calculated by the arithmetic unit based on the average number of data bits containing character information per scan, the average number of scans per character segment and the standard deviation of the number of scans in the character segments (i.e. width of the character segments). The recycle number is utilized to form combined character segments which comprise two or more adjacent character segments and the spaces there between. If adjacent character segments and the space there between is less than or equal, i.e., does not exceed the recycle number, another adjacent character space is combined therewith until the combination of an additional character segment exceeds the recycle number. This function is performed by a processor which is connected to the segment memories and to the arithmetic unit. The combined character segments are stored into a temporary storage unit for utilization by the processor and into other temporary storage units which in turn are connected to the arithmetic unit. Certain adjacent character segments cannot be combined if the space there between contains a certain number of scans without any data bits containing character information. The certain number of scans which do not contain character information is determined from a look up table and is based on the average number of data bits containing character information per scan. The arithmetic unit utilizes the combined character segments to calculate a new recycle number which is then applied to the original character segments stored in the segment memory. The last recycle number is compared to the recycle number just calculated. If the recycle number has not changed, the combined character segments in the temporary storage unit represent the results of the final iteration of this part of the operation. This set of final combined character segments is utilized in the remainder of the character presence detection operation.

The system for character presence detection then performs a combined character recovery operation and then locates spaces which represent voids between words rather than gaps between characters within the same word. The arithmetic unit calculates a suspect character width, a maximum and minimum natural break value. These numbers are then utilized by the processor to test the combined character segments. If any of the combined characters is greater than or equal to, i.e. exceeds, the suspect character width then that particular combined character segment is combined with the combined character segment which was received prior thereto and the space there between. This sum is then examined to determine if it is within the range of the natural break maximum and minimum. It should be noted that the same inhibit rules concerning the scans without character information discussed above apply to the combined character recovery operation also. If the sum is within the natural break range, then the centers for the combined character segments are adjusted as though each combined character has the same width with a space of one scan there between if the sum is an odd number. In other words, a pair of character segments is formed, each having a width equal to approximately one half the sum. If this first sum derived is not within the range of natural break minimum and maximum, the combined character segment, which exceeds the suspect character width, is combined with the adjacent combined character segment received subsequent to the combined character segment which exceeds the suspect character width. This sum is then compared to the range of natural break minimum and maximum as discussed above and if within the range, the character centers are adjusted as discussed above.

Each combined character segment is then compared to the natural break minimum to determine if any combined character segments are greater than the natural break minimum. If a combined character segment is greater than the natural break minimum, that character segment is broken into two characters of equal width. In other words, a pair of combined character recovery character segments is formed have total width approximately equal to the combined character segment from which they were formed. If the combined character segment is an odd number, then a space of one scan is disposed between the two characters. Those character segments which are formed during the combined character recovery operation are utilized to form a series of combined character recovery character segments with spaces disposed there between.

The arithmetic unit then calculates a delimiter value which is based on the average number of scans per space and the standard deviation of the spaces. Any space greater than the delimiter value is declared a void between a word and not a gap between characters.

The system for character presence detection, after completing its method of character detection by locating the centers of the characters, the gaps between characters, and voids between words, passes this information to the character recognition unit for the purpose of assisting the character recognition unit in its recognition function.

BRIEF DESCRIPTION OF THE DRAWINGS

FIGS. 11 and 12 are a graphic representation of a line of stored video to be operated upon by the system for character presence detection of the present invention;

FIGS. 13, 14, 15, 16, and 17 illustrate diagrammatically electronic character images comprising a line of characters within a binary data stream;

FIGS. 18, 19, 20, 21, and 22, diagrammatically illustrate electronic character images comprising several lines of characters within a binary data stream.

DESCRIPTION OF THE PREFERRED EMBODIMENT

Figure 1:
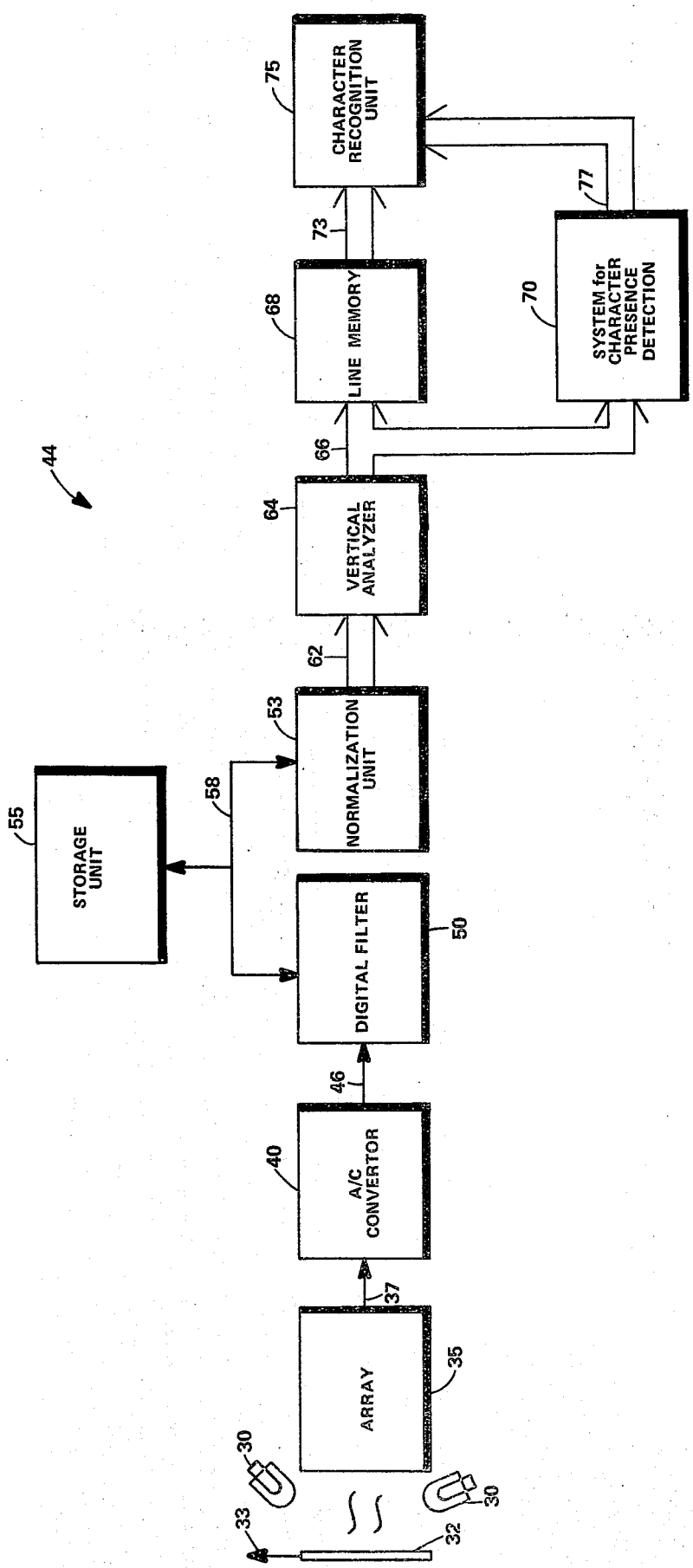
FIG. 1 is a block diagram of a character recognition system having the character system for character presence detection of the present invention disposed therein.

With reference to the drawings and in particular to FIG. 1 thereof, lamps 30 illuminate a written medium 32 which can be, for example, a document or letter being transported by a drive means (not shown) in the direction of arrow 33. The written medium can have several lines of alphanumeric characters disposed thereon which contrast with the background of the written medium. The alphanumeric characters can comprise, for example, a postal address. The light reflected from the written medium is focused by a lens (not shown) onto a photosensitive device such as a self-scanning photocell array 35. Other types of scanning can be utilized with the present invention; for example, a flying spot scanner with light reflected from the written medium 32 being focused onto a single photo detector such as a photomultiplier tube.

The photocell array 35 can be of a type known as a linear photocell array (or one dimensional photocell array) with photocells located in a single line perpendicular to the direction of motion of the written medium 32 as shown by arrow 33. The photocell array 25 is continuously scanned by means of a multiplexer located on the same semiconductor chip as the photocells and provides analog output through line 37 to analog to digital converter 40. During a scan of the photocell array, the multiplexer located on the photocell array 35 selects each cell from one end of the array to the other in a predetermined sequence and provides the output of those photocells sequentially as a serial output to line 37. The usual timing pulses which occur when a cell is selected by the multiplexer located on the same chip as array 35 are also provided as outputs to analog to digital converter 40 through lines (not shown). The scan start pulse of the photocell array is also provided to various units within the character recognition system (generally designated by the numeral 44) including the converter 40. Timing pulses, which indicate the selection of a new photocell by the multiplexer of the photocell array 35, control the data rate at which the system 44 generally operates. In other words, the usual timing, reset, and other functions of analog and digital logic circuits are utilized throughout.

The analog to digital converter 40 provides a 4 bit parallel output through multi-line channel 46 to digital filter 50. The 4 bit output of analog to digital converter 40 to channel 46 is the analog input on line 37 converted to a digital format. That format can be, for example, 0000 for white to 1111 for black with, of course, the gray levels in between. Digital filter 50 has the function of determining whether or not a particular 4 bit output from converter 40 is black or white, i.e., whether the particular output represents background information or character information, respectively. Various methods can be utilized to determine whether or not a particular gray level is white or black; for example, by setting an arbitrary threshold value above which the 4 bit output is considered black and below which the output is considered white. The terms black and white as utilized herein are defined as representing character information and representing background information, respectively. A particular 4 bit gray level can also be compared to the output of surrounding cells and to its own output in several consecutive and adjacent scans to determine whether or not that particular cell during a particular scan is black or white. Adjacent scans are defined as scans of the photocell array which occurred without intervening scans of the array. Consecutive scans are group of scans, each scan of which is adjacent to at least one other scan of the group. Combinations of the arbitrary threshold and the comparison of adjacent outputs can also be utilized.

The binary data stream of black/white decisions is provided to a size normalization unit 53 and storage unit 55 over buss 58. Storage unit 55 is capable of storing all of the video which results from the scan of the written medium 32. After the video from the entire document is stored in unit 55 or perhaps as the video is being stored, the video is addressed by size normalization unit 53 through buss 58 for the purpose of finding lines of video within the image stored in storage unit 55. When a line of video is located within the storage unit 55, size normalization unit 53 alters the character images which comprise the line of characters within storage unit 55 to a certain predetermined size and outputs the line of characters through channel 62 to vertical analyzer 64. Vertical analyzer 64 provides, as an output to channel 66 data bits divided into scans which are 32 data bits in length. The line is deskewed if necessary and the characters generally comprise the center 16 data bits of the scans. The vertical analyzer 64 is connected through channel 66 to line memory 68 which is capable of storing an entire line of characters and can be, for example, a plurality of shift registers or a RAM type memory or any other standard memory with read/write capability as known in the art. Channel 66 is also connected to the system for character presence detection 70 of the present invention. The output of the line memory is connected through channel 73 to a character recognition unit 75. The output of the system for character presence detection 70 is connected through channel 77 to the character recognition unit 75. The character recognition unit can be a mask type unit as shown in patent number U.S. Pat. No. 3,761,876 or a feature type recognition unit as shown in U.S. Pat. No. 4,093,941 or both.

Figure 2:
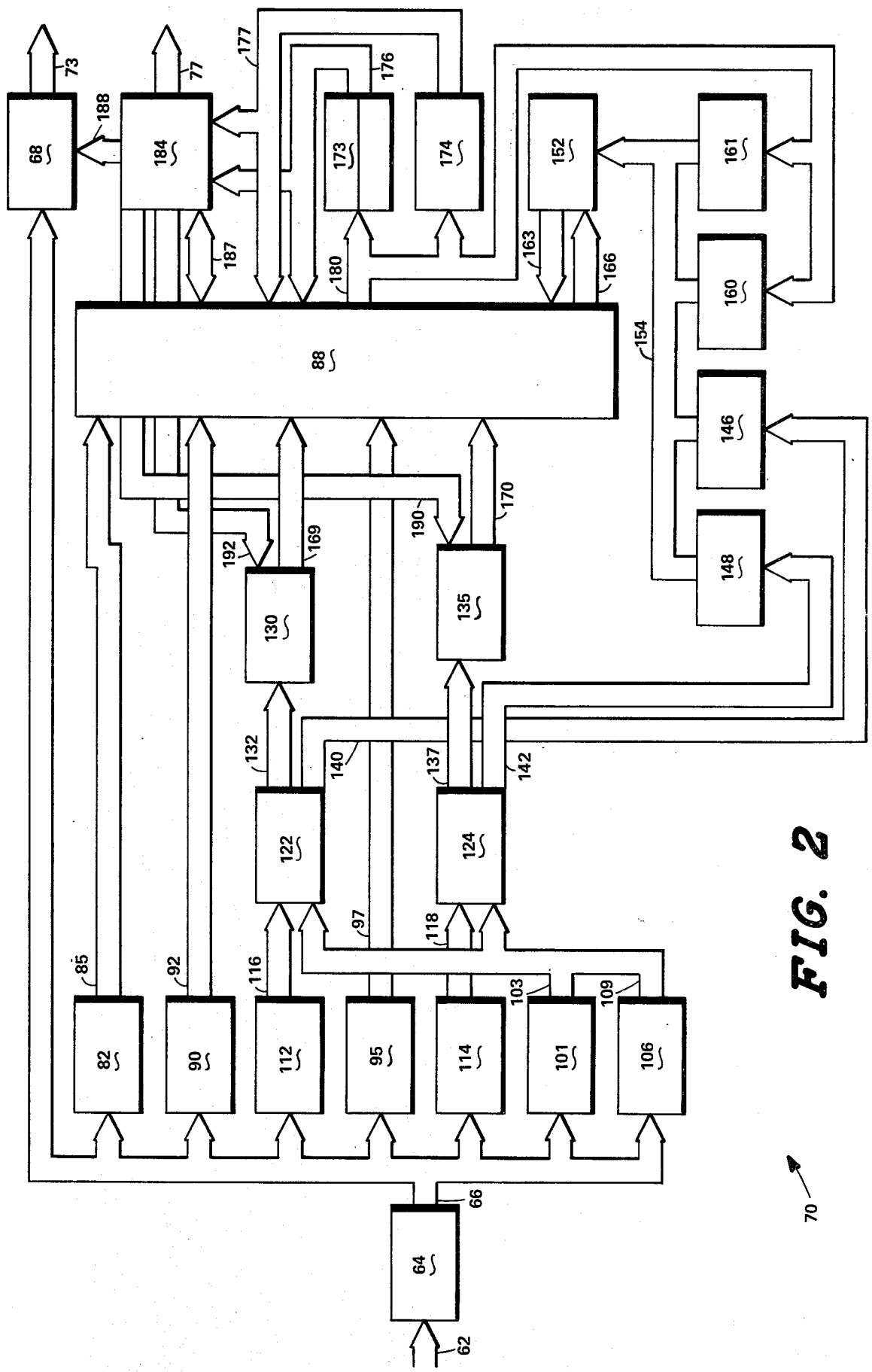
FIG. 2 is a block diagram of the system for character presence detection constructed according to the present invention.

The system for character presence detection 70 is shown in more detail in FIG. 2. Channel 62 is shown connected to transfer the 32 data bit long scans to vertical analyzer 64 which functions as discussed above and outputs the characters generally centered in the scans to channel 66. The characters are only generally centered in the 32 bit long scans because some of the characters will of course be of different heights and will have been disposed slightly differently on the written medium 32 (FIG. 1). Also, certain extraneous matter other than the characters can be present on the written medium such as smudges above and below the characters and therefore the video cannot be exactly centered but the vertical analyzer generally disposes the video at the center of the 32 bit scans. The characters will generally be 16 bits high because the normalizer unit 53 (FIG. 1) has attempted to make the characters 16 bits high, although because of the smudges and extraneous material which may be present on the written medium the 16 bit high character is only the goal and cannot always be the result.

As shown in FIG. 2, channel 66 connects the vertical analyzer 64 to the line memory 68 and to the system for character presence detection 70. Channel 66 is connected to a black cell counter 82 which counts each data bit which contains character information, within the binary stream comprised of the 32 data bit long scans from vertical analyzer 64. The black cell counter is of sufficient size so that it is capable of counting all the data bits which contain character information (sometimes referred to herein as a black cell) over an entire line of characters. The output of black cell counter 82 is connected through multi-line channel 85 to a processor 88. Also connected to channel 66 is a scan counter 90 which counts the data bits present in the binary stream from vertical analyzer 64. The function of the scan counter 90 is to count the scans received from the vertical analyzer 64. This can be done, for example, by dividing the number of data bits received from the vertical analyzer by 32. The output of scan counter 90 is connected through multi-line channel 92 to processor 88. The scan counter 90 should be capable of maintaining a count sufficiently high without recycling to count all the scans comprising a line of characters.

An end of line and reset unit 95 is also connected to vertical analyzer 64 through channel 66. The unit 95 monitors the binary stream and detects an end of line indication from the vertical analyzer which comprises 64. When this occurs, unit 95 outputs an end of line and reset signal though channel 97 to processor 88 which in turn notifies other components of the system 70 that end of line indication has been received. The vertical analyzer could be designed to provide the end of line indication on a separate line which would be one of the lines of channel 66 connected directly to the end of line and reset unit 95. Prior to the receipt of data, unit 95 receives a signal from vertical analyzer 64 and outputs reset signals to processor 88 which in turn resets the various other units, for example, black cell counter 82 prior to the receipt of a new line of video.

Channel 66 is also connected to detector 101. Detector 101 monitors each 32 bit scan of data bits and if none of the data bits contains character information, detector 101 outputs to channel 103 a signal so indicating. A sneak through detector 106 also monitors 101 the binary stream on channel 66. As stated above, each photocell of array 35 (FIG. 1) is addressed in a predetermined sequence. This sequence is maintained as the data bits are moved through character recognition system 44 (FIG. 1). Thus, within each of the scans comprising 32 data bits which are the output of vertical analyzer 64 the sequence is maintained, although, of course, only a portion of the cells is represented by each 32 bit scan.

Each data bit occupys a unique position within its scan. Thus, a particular data bit occupying a certain position in one scan represents the identical cell as the data bit occupying that certain position within another scan (of the same line of data). Although the general sequencing is maintained, it may be necessary because of skew in the line that this is not exactly true. The electronic image may have been corrected for certain misalignment problems in the drive means (not shown) moving the written medium 32, etc. In other words, it may have been necessary to slightly adjust the electronic image because of this misalignment problem. However, it is best to visualize the data bits occupying the certain position as all representing outputs of the same photocell of array 35 (FIG. 1).

The function of the sneak through detector 106 is to determine if the data bits occupying any of the positions from the beginning to end of the scan just received has contained character information for that scan and the three prior, consecutive scans. The purpose of the sneak through detector 106 is to find gaps between character segments within the electronic image which are not disposed along the scan but rather passed diagonally through a number of scans. When none of the 32 positions of data bits has contained character information over the past three scans and the current scan, the sneak through detector 106 so indicates by an output to channel 109.

Finally, scan detectors 112 and 114 receive the output of vertical analyzer 64 from channel 66. Each of the scan detectors 112 and 114 examines the binary data stream from vertical analyzer 64 and determines if the data bits within the binary stream meet certain criterion on a scan by scan basis. The criterion utilized general test the positional relationships of the data bits containing character information within each scan. Each of the scan criterion used by the detectors is different and predetermined. Scan detector 112 examines the binary data stream to determine if two of any six adjacent data bits contain character information. Adjacent data bits could be visualized as data bits from adjacent photocells on array 35. The two of any six data bits containing character information test is the criterion by which scan detector 112 examines each scan of the data stream. If for the particular scan being examined the criterion is met i.e., two of six adjacent data bits containing character information, scan detector 112 so indicates by output to channel 116.

Although scan detector 114 utilizes a criterion which is different from the criterion utilized by scan detector 112, scan detector 114 examines the data stream on a scan by scan basis in much the same manner. The particular criterion utilized by scan detector 114 is to examine the scan to determine if three of any five cells contain character information. That is, if three of any five adjacent data bits contain character information, the criterion of scan detector 114 is met and the scan detector so indicates by a signal to channel 118. However, scan detector 114 utilizes a second criterion and thus is reality examines the data stream for occurrence of two criteria. The second criterion is two adjacent data bits containing character information and occurs at least twice within the same scan. Thus, if three of five adjacent data bits contain character information or if two adjacent data bits containing character information occurs at least twice, scan detector 114 signals that its criterion is satisfied by an output to channel 118.

Scan detectors 112 and 114 are connected to segment generators 122 and 124, respectively. Scan detector 112 is connected via channel 116 as an input to segment generator 122. The other inputs to segment generator 122 are from detectors 101 and 106 through channels 103 and 109, respectively. Segment generator 124 also receives the otuputs of detectors 101 and 106 through channels 103 and 109, respectively. Further segment generator 124 is connected to the output of scan detector 114 via channel 118. Briefly, the segment generators 122 and 124 (to be discussed in detail hereinafter) compile character segments and spaces there between by encoding, for example, by accumulating the number of sonsecutive scans for which its associated scan detector indicates that its particular criterion has been met. The signals from detector 106 are utilized to end character segments and the number of scans which have no data bits containing character information from detector 101 are recorded by the segment generators. The function of the segment generators is to compile and encode the data from its associated scan detector and detector 101.

All of the encoded information within segment generator 122 is transferred and stored within memory 130 through multi-line channel 132. The encoded information comprises the character segments in sequence as they occur, the spaces there between, and the scans which contain no character information as determined by detector 101 associated with a particular space. The same categories of encoded data are transferred from segment generator 124 to memory 135 via channel 137. Segment generators 122 and 124 provide as outputs the width of the character segments and the spaces there between to channels 140 and 142, respectively. Channels 140 and 142 are connected to storage units 146 and 148, respectively. The storage units 146 and 148 are connected to an arithmetic unit 152 via a buss 154. Bus 154 also connects arithmetic unit 152 to storage units 160 and 161.

The output of arithmetic unit 152 is connected via a multi-line channel 163 to processor 88. The arithmetic unit performs certain calculations (which are discussed in detail here below) and the results of those computations are received by the processor 88 through channel 163. The processor provides certain data and instructions to the arithmetic unit 152 through multi-line channel 166. Processor 88 also has access to the data stored in memories 130 and 135 via multi-line channels 169 and 170, respectively. Processor 88 also receives inputs from temporary storage units 173 and 174 through channels 176 and 177, respectively. Processor 88 has one of its outputs connected to channel 180. Through channel 180 processor 88 is connected to temporary storage units 173 and 174 and storage units 160 and 161. Temporary storage unit 173 is utilized to store the combined character segments and the spaces there between formed by processor 88. Temporary storage units 160 and 161 are utilized to store the combined character segments for utilization by the arithmetic unit 152. Temporary storage unit 174 performs the function of storing the results of various operations performed by processor 88 while performing the combined character recovery operation (to be discussed herebelow).

Channels 176 and 177 also connect temporary storage units 173 and 174 to a memory control unit 184. Control unit 184 has an output to processor 88 and receives information and instructions from processor 88 via channel 187. Processor 88 utilizes the inputs from memory control unit 184 to control the temporary storage units 173 and 174. Memory control unit 184 also has outputs to memories 130 and 135 via channels 190 and 192, respectively. The outputs to the memory units provide control over these memories, for example, to insure the proper storage of the inputs from the segment generators 122 and 124, respectively. The memory control unit provides the width of character segments and the center of the characters as determined by processor 88 to character recognition unit 75 (FIG. 1) via channel 77. Memory control unit 184 also controls line memory 68 through channel 188.

Figure 3:
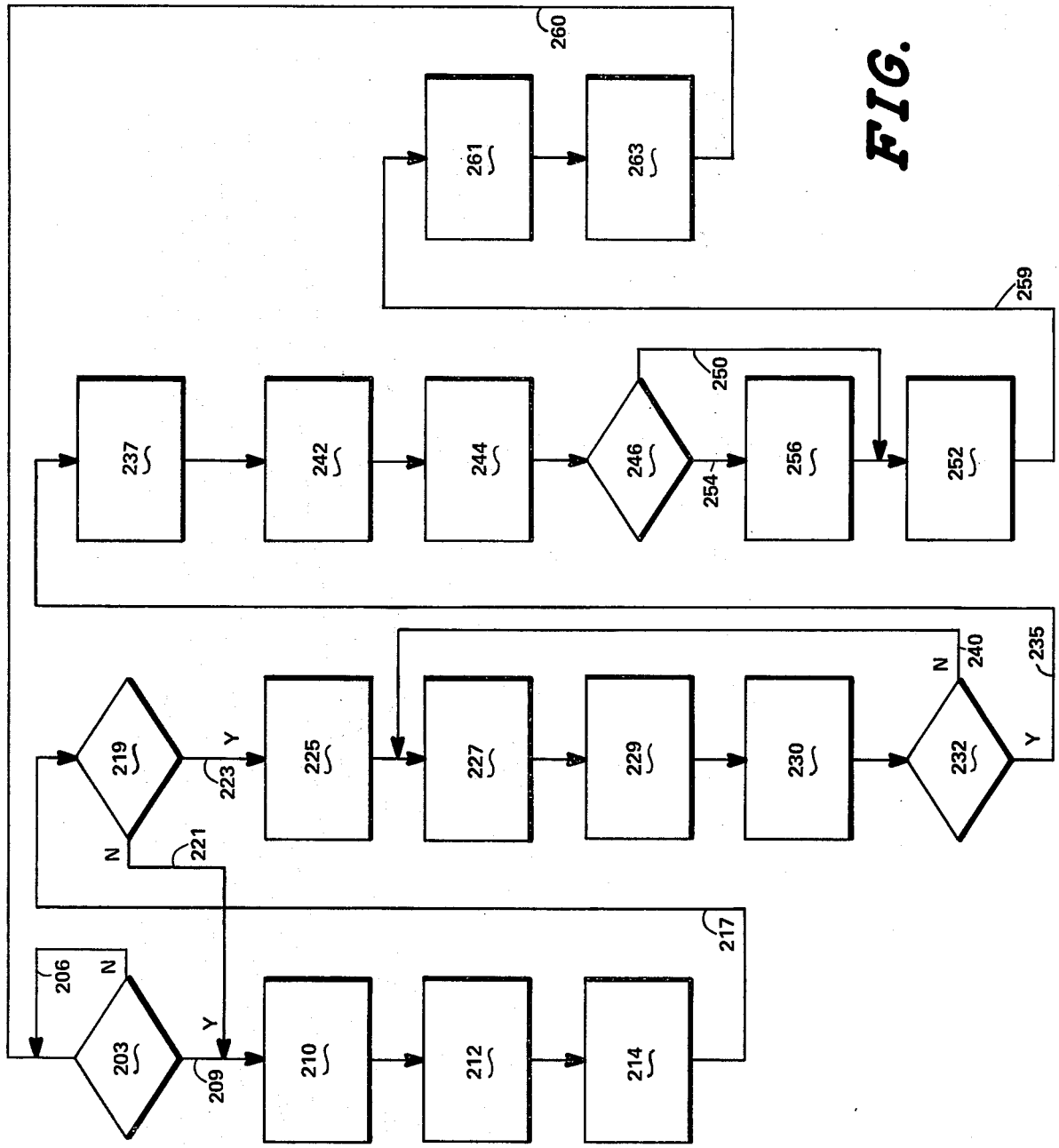
FIG. 3 is a logic diagram of the operation of the system for character presence detection shown in FIG. 2 utilizing the method of the present invention.

The operation of the system for character presence detection 70 is shown generally by the logic flow diagram of FIG. 3. In logic state 203, unit 95 (FIG. 2) awaits a signal from vertical analyzer 64 that a new line of characters is to be transferred to the system for character presence detection 70. If the signal is not received, the logic cycles through logic path 206 and reenters state 203. If the new line indication is received, logic proceeds from state 203 through path 209 and enters logic step 210. In step 210 the detectors 112 and 114 test the incoming scans of data with their criterion. Also the black cell counter 82 and scan counter 90 and detectors 101 and 106 function as discussed above in relation to FIG. 2. After the scan is examined with the criterion, the logic passes from step 210 onto step 212. In step 212 the segment generators 222 and 224 (FIG. 2) generate character segments and spaces based on scans meeting or not meeting the criterion. Also the inputs from the detector 101 are utilized to end the character segments. The output of detector 106 is noted for the space. In step 214 which follows step 212 any completed character segments and spaces are stored into memories 130 or 135 as appropriate. From step 214 logic moves through path 217 to state 219. In logic state 219 if unit 95 has not received an end of line signal, logic moves through path 221 and reenters step 210 and the logic continues as discussed above. If a line complete signal is received, logic passes through path 223 and enters step 225. Either the output of segment generator 122 or 124 is selected as the character segments used in the remainder of the method. The selection is made based on the average number of data bits containing character information per scan (BAV). If BAV is <5 then the character segments produced by segment generator 122 is utilized. In step 225, processor 88 notifies arithmetic unit 152 to perform its calculations (to be discussed here below) on the information loaded into either storage units 146 or 148. The recycle number (RC) is calculated in accordance with the following formula.

$$RC = (10 - BAV) + ACW + SD,$$

where BAV is the average number of data bits containing character information per scan as derived by the information received from black cell counter 82 by processor 88; (this calculation can be performed by any number of well known methods in the art and could be performed by processor 88 or by arithmetic unit 152 and is in this embodiment performed by processor 88.) ACW is the average character width excluding segments less than eight; and SD equals the standard deviation of the number of scans in the character segments. In other words, BAV equals total number of data bits containing character information as counted by counter 82 (FIG. 2) divided by the total scan count from counter (FIG. 2). ACW equals the sum of the scans comprising the character segments excluding character segments less than eight divided by the number of character segments excluding segments less than eight. SD equals square root of the sum of the scans in each character segments squared minus the number of character segments times the average character segment width squared divided by number of character segments minus one.

$$SD = \frac{(\text{Sum of widths})^2 - (\text{No. of Character Segments})*(\text{Average Character Width})^2}{(\text{No. of Character Segments}) - 1}$$

The recycle number calculated by arithmetic unit 152 is compared to the selected character segments beginning with the first character segments produced by the character segment and stored into a memory. For example, if the character segments produced by generator 122 and stored into memory 130 are selected, the first character segment generated and stored into memory 130 is addressed by memory control unit 184 and processor 88 compares character segment to the recycle number. The first character and then the next character segment produced by segment generator 122 can be combined including the space there between and the number of scans comprising the two character segments and the space is less than the recycle number. Next the third character segment and the space between the second and third character segments are added to the sum of first and second character segments.

If the number of scans comprising the three characters segments and the spaces there between are less than the recycle number, the process continues. However, if the number of scans representing the sum of the three character segments and the two spaces there between exceeds the recycle number, the first two character segments and the space there between are combined into a combined character segment which is stored into temporary storage unit 173 and storage units 160 and 161. The third character segment is then added to the fourth character segment and this sum including the space there between is compared to the recycle number of the operation continues as discussed above. After all the character segments have been tested against the recycle number and the combined characters and those characters which could not be combined are stored into temporary storage unit 173 and storage units 160 and 161 as a series of combined character segments and spaces there between. Arithmetic unit 152 utilizes the combined character segments to calculate a new recycle number which is utilized by processor 88 to again compare the character segments stored in either memory 130 or 135 as selected. The newly generated combined character segments are again stored into a temporary storage unit 173 and storage units 160 and 161.

If the newly calculated recycle number transferred to processor 88 by arithmetic unit 152 is not changed from the last recycle number calculated, the operation is terminated and no further character combinations are made as discussed above. It should be noted that processor 88 does not combine character segments under certain conditions, i.e., the signals generated by detector 101 which indicate that a particular scan is not comprised of any data bits which contain character information. If BAV is greater than or equal to six, one scan between characters which does not contain any character information inhibits the combination of the adjacent character segments. If BAV is equal to five, two scans which do not contain character information are required to inhibit the combination of the character segments. Likewise, the BAV values of four and three or less require three and four scans, respectively, which do not contain any character information as indicated by detector 101 to inhibit the combination. Even though certain character segments are not combined, they still comprise segments within the series of combined character segments.

Once the recycle number is found not to change the combined character segments (along with any character segments which were of either sufficient width not to be combined or which had spaces disposed on either side which had sufficient scans not containing character information to prevent combination under the rules discussed here above) the operation is terminated. Also stored in temporary storage unit 173 are the spaces between the combined character segments. The characters are combined in step 227 which follows step 225. In step 227, processor 88 combines character segments if possible under the inhibit rules concerning the spaces which contain scans without character information disposed therein. The combination of two or more character segments and the spaces there between must be less than recycle number as discussed above. The combined character segments, if they can be combined and the character segment if they cannot, are stored into the temporary storage unit 173 in step 229 to form the series of combined character segments. Logic then moves from step 229 through step 230 and enters state 232. In step 230, a new recycle number is calculated based on the combined character segments and any character segments not combined in the series (term combined character segments is the series shall include both the characters which are actually combined and those which are greater than the recycle number of which cannot be combined because of the inhibit rules discussed above). The newly calculated recycle number is compared to the old recycle number in state 232.

If the recycle number has not changed, logic moves through path 235 and enters step 237. If the recycle number has changed, logic goes through path 240 and reenters step 227. The new recycle number in step 227 is utilized to test the original character segments and to form a new series of combined character segments which is comprised of both characters which are actually combined with those which are either greater than the recycle number or which are not combined because of the inhibit rules as discussed above.

During step 237, a number called the suspect character width (SCW) is calculated by the processor 88. SCW equals the average combined character segment (CC) width plus the average combined character width divided by the standard deviation of the width of the combined characters. This is expressed by the following equation:

$$SCW = ACS + ACS/SD$$

where ACS equals the sum of the scans for all the combined character segments divided by the number of combined character segments excluding segments less than eight scans wide, and SD equals square root of the sum of the squared number of scans in each character width minus the number of combined character segments times ACS squared divided by number of combined character segments minus one.

$$SD = \frac{(\text{Sum of widths})^2 - \text{No. of } CC \cdot (ACS)^2}{\text{No. of } CC - 1}$$

The logic then moves from step 237 to step 242. In step 242, the natural break minimum (NBMIN) is calculated by processor 88. NBMIN equals two times ACS minus SD minus P where ACS is the average combined character segment width, SD is the standard deviation of the combined character segments calculated as discussed above, and P equals the number of character segments greater than ACS plus SD. Logic then moves from step 242 to step 244. The formula is as follows: NBMIN = 2×ACS-SD-P. In step 244 arithmetic unit 152 calculates natural break maximum (NBMAX) by utilizing the following formula:

$$NBMAX = 2 \times ACS + 5 - P,$$

where ACS is the average combined character segment width and P is the number of character segments greater than ACS plus SD where SD is the standard deviation. Having calculated the suspect character width and the natural break maximum and minimum, the logic moves from step 244 and enters state 246. In state 246 each combined character segment (CCS) is compared to the suspect character width. If none of the combined character segments are greater than or equal to the suspect character width (SCW), the logic goes through path 250 and the logic enters step 252. If while in state 246 a combined character segment is found to be greater than or equal to the suspect character width, the logic goes through path 254 and enters step 256. In step 256 processor 88 applies the inclusive range of NBMAX and NBMIN to the sum of the combined character segments greater than or equal to the suspect character widths and one of its adjacent segments. Subject to the recycle inhibit rules as discussed above and set forth in Table I here below, all of the combined character segments which are greater than or equal to the suspect character width are combined with the prior adjacent combined character segments in the series, and the spaces there between to determine if the sum of the two combined characters and the space there between is within the inclusive range of NBMIN and NBMAX.

Table I

| BAV Value | Number of scans without character information to inhibit combination. |
|---|---|
| BAV = 6 | 1 Scan |
| BAV = 5 | 2 Scans |
| BAV = 4 | 3 Scans |
| BAV = 3 | 4 Scans |

In other words, the combined character segment width, which is greater than or equal to the suspect character width, is added to the number of scans comprising the combined character which was formed from data received by the system 70 prior to the receiving the data which was utilized to form the combined character segment greater than or equal to the suspect character width. If that sum is not within the inclusive range of NBMIN to NBMAX, then the combined character segment which is greater than the suspect character width is added to the combined character segment and the space there between which was generated from data received by system 70 subsequent to the data utilized to construct the character segment greater than the suspect character width. If neither of these are within the range or the recycle inhibit rules apply the combined character segments remain the same. If the two character segments can be combined within the NBMAX NBMIN inclusive range, then the centers of the combined character segments for those two combined character segments are adjusted as if each character has the same width allowing a space of one scan if the combined width is an odd number. A pair of character segments is created having equal widths. The combined width of the two is approximately equal to the width of the two combined character segments from which they were created. During step 256 integrations are continued until all of the combined character segments which are greater than or equal to the suspect character width have the above described procedure applied to them. The logic then proceeds from step 256 and enters step 252.

During step 252 each of the combined character segments is tested to determine if any are greater than the natural break minimum. If any of the combined character segments are greater than the natural break minimum, then that particular combined character segment is broken into two characters of equal width. If the combined character is comprised of an odd number of scans, it is broken into two characters equal width with a one scan space there between. Processor 88 (FIG. 2) tests each of the combined character segments in temporary storage unit 173 supplied by the storage unit through channel 176 against the natural break minimum value (NBMIN). This completes the combined character recovery operation and the logic now moves through path 259 and enters step 261.

In step 261, the processor 88 utilizes the space information stored in temporary storage unit 173 to locate the spaces which are voids between words rather than gaps between characters in the same word. This is referred to herein as a delimiter value and is derived from the following equation:

$$D = 2 \times AVS + T$$

where AVS is the average number of scans per space segment exluding those spaces greater than 25 scans and T is the standard deviation of the spaces. The The standard deviation T is calculated from the formula the square root of the sum of the number of scans of each space minus the number of spaces times the average space width squared divided by the number of spaces minus one.

$$T = \frac{(\text{Sum of space})^2 - \text{No. of spaces} * (AVS)^2}{\text{No. of spaces} - 1}$$

The delimiter value calculated in step 261 is utilized in step 263 to apply the delimiter value to find the voids between words. Any space greater than 14 scans and also greater than the delimiter value is declared a void between words rather than a gap between characters within the same word. Logic then proceeds from step 263 through path 266 and reenters state 203 to await the new line signal.

Figure 4:
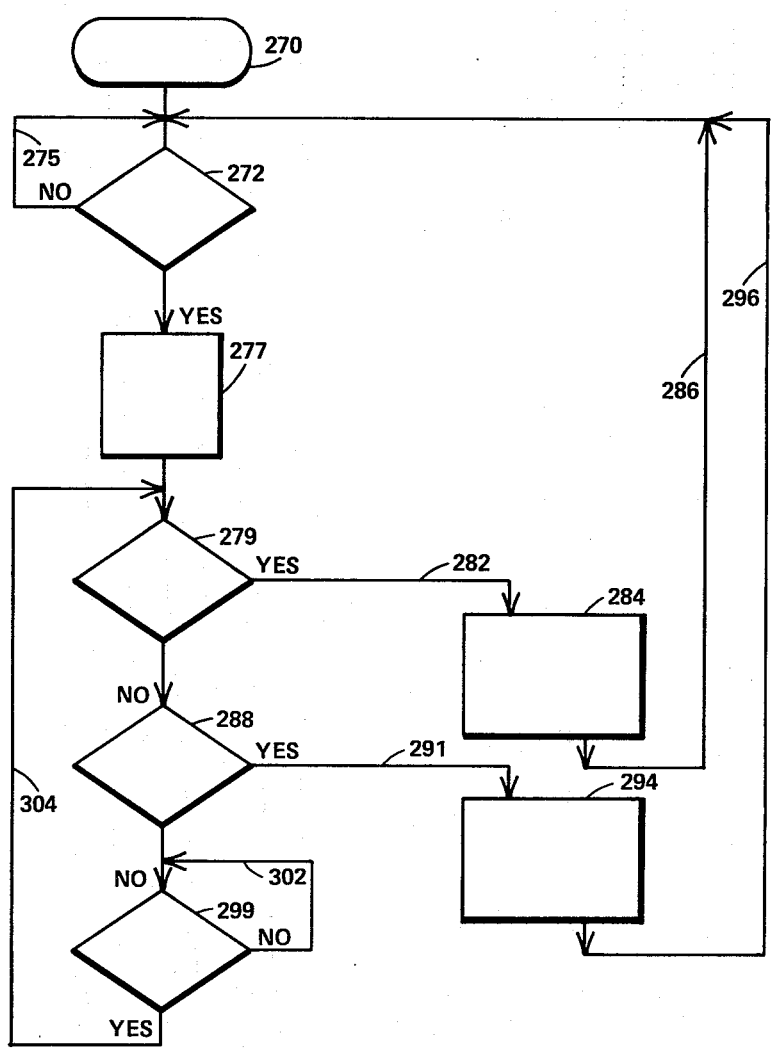
FIG. 4 is a logic diagram of one of the scan detectors of FIG. 2.

As shown in FIG. 4, the operation of scan detector 122 is shown in detail and commences in state 270 which is the reset reset mode when the equipment is turned on or reinitialized. From state 270 the logic passes into state 272. In state 272 channel 66 is monitored to detect a new scan of data. If no new scan is received, the logic recycles through path 275 and reenters state 272. When a new scan is detected, logic passes from state 272 and enters step 277. The first six bits of the scan are accumulated in step 277. When six bits are accumulated, the logic passes from step 277 and enters state 279. In state 279 the six bits are examined to determine if two or more data bits contain character information. If two or more contain character information, then the logic passes from state 279 through path 282 and enters step 284. During step 284 character generator 112 indicates through channel 116 to segment generator 122 that this particular scan meets the criterion of scan detector 112. The logic then goes through path 286 and reenters state 272. If in state 279 two or more data bits of the six data bits have not contained character information, logic would have proceeded into state 288. In state 288 scan detector 112 determines if the 32 bits of the scan have been examined, i.e., is this the end of the scan?

If the scan has ended, the logic passes through path 291 and enters into step 294. In step 294 scan detector 112 indicates to segment generator 122 that the criterion has not been met for this particular scan and therefore this scan is a part of a space. Logic then proceeds through path 296 and reenters state 272. If during state 288 the end of the scan is not detected, logic proceeds on and enters state 299. In state 299, the next data bit is awaited from vertical analyzer 64 through channel 66. If the next data is not yet received, the logic recycles through path 302 and reenters into state 299. If the next data is received while in state 299, the logic proceeds through path 304 and reenters into state 279. The logic then proceeds as discussed here above. In state 319, the last 6 bits received are examined to determine if they meet the criterion. Thus, as can be seen from FIG. 4 the detector 112 indicates from its criterion which is two of any six data bits containing character information is met. This output is communicated to segment generator 122.

Figure 5:
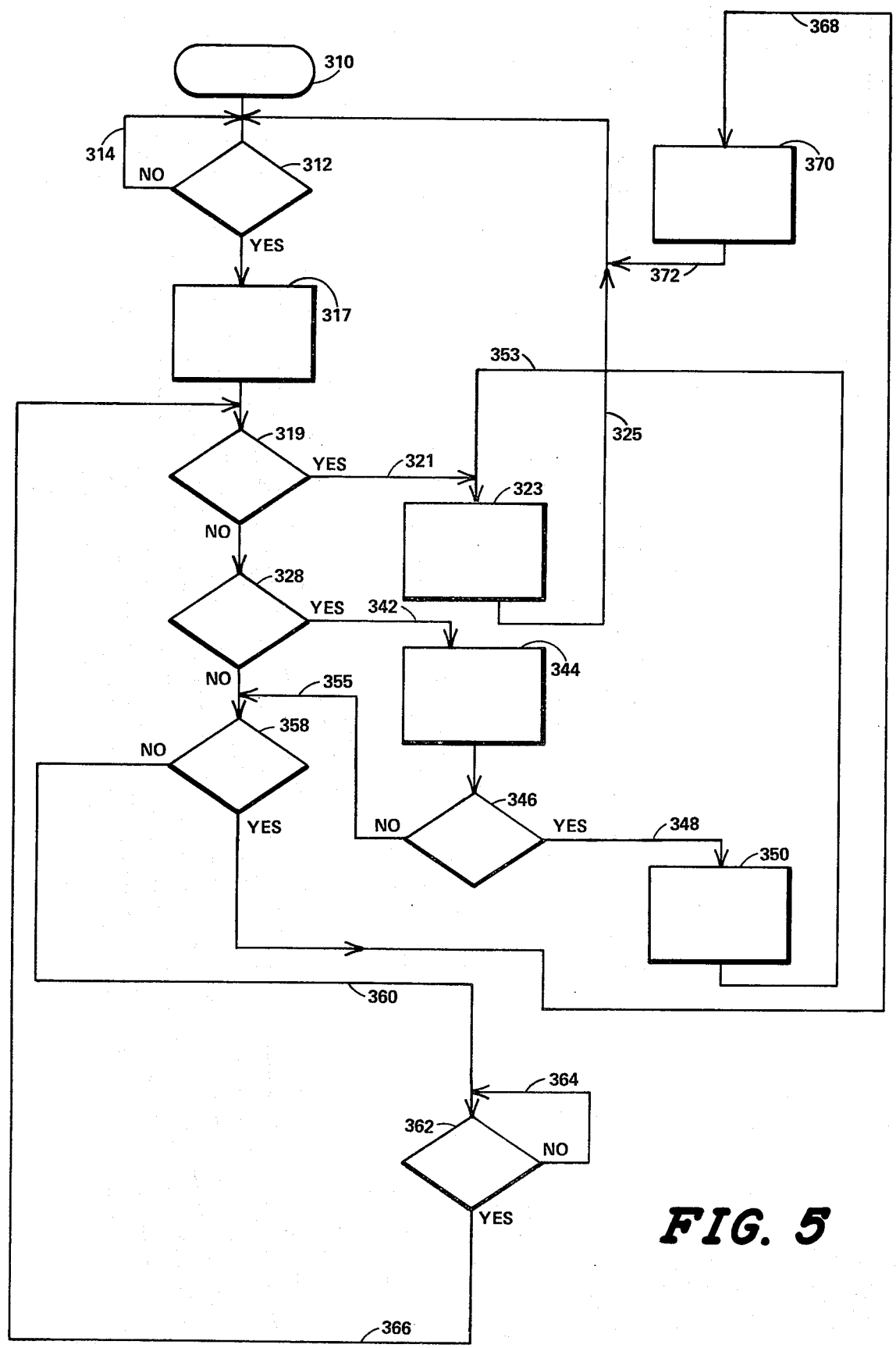
FIG. 5 is a logic diagram of another scan detector shown in FIG. 2.

The logic diagram of the operation of scan detector 114, which is somewhat dissimilar to scan detector 112, is shown in FIG. 5. In state 310 the logic of the scan detector is initialized or reset. From state 310 logic proceeds to state 312. In state 312 if a new scan is not received, the logic recycles through path 314 and reenters state 312. If a new scan is received while the logic is in state 312, the logic proceeds to step 317. In step 317, the first five data bits of the scan are accumulated. The logic then proceeds from step 317 and enters into state 319. While logic is in state 319, the five data bits are examined to determine if three or more cells contain character information. If there are three or more data bits containing character information, the logic proceeds through path 321 and enters step 323. In step 323 a signal is sent by scan detector 114 to segment generator 124 indicating that this particular scan meets the criterion of scan detector 114. The logic then proceeds through path 325 and reenters state 312.

If while the logic was in state 319 three or more cells did not contain character information, logic proceeds from state 319 to state 328. The five data bits are then examined to determine if two adjacent cells contain character information. If two or more cells which are adjacent and contain character information are present, the logic proceeds through path 342 and enters into step 344. In step 328, a determination is made to detect if the pair of adjacent data bits has been counted. In step 344 a counter is advanced by one each time the logic enters into step 344. From step 344 the logic proceeds through to state 346 wherein the output of the counter which was incremented during step 344 is examined to determine if the output is equal to two. If the output is equal to two logic passes through path 348 and enters step 350. In step 350 the increment counter is reset to zero and the logic moves through path 353 from step 350 and enters into step 323. During step 323, as discussed above, a signal is sent from scan detector 114 to segment generator 124 indicating that the scan meets the criterion of scan detector 114.

If during state 346 the output of the counter is determined not to be equal to two, logic proceeds through path 355 and enters into state 358. In state 358 a test is made to determine if each bit of the scan has been examined, i.e., have 32 data bits of the scan then examined in states 319 and 328. If they have not, the logic moves through path 360 and enters into state 362. If there are not two adjacent data bits containing character information or the adjacent data bits have been counted previously the logic proceeds from state 328 to state 358.

In state 362, the arrival of a new data bit from vertical analyzer 64 through channel 66 is awaited. If the new data bit is not received the logic recycles through path 364 and reenters state 362. If the data bit is received the logic moves from state 362 through path 366 and enters into state 319. The logic proceeds from state 319 as discussed above. If while in state 358 it is determined that all of the 32 data bits of the scan have been analyzed and examined in state 319, i.e., all data bits were a part of the five bit window utilized in states 319 and 328, the logic proceeds through path 368 and enters step 370. In step 370 the signal is sent by scan detector 114 to segment generator 114 indicating that the scan does not meet the criterion of scan detector 114. Logic then proceeds from step 370 through path 372 entering into state 312, and the logic proceeds as discussed above.

Thus, the scan detector 114 is capable of utilizing two different criterion to determine if the character information (if any) within the scan, possibly represents a portion of a character segment or a space. The two criterion utilized are if three or more data bits of any five data bits contain character information or if two adjacent data bits containing character information occurs at least twice during the scan.

Figure 6:
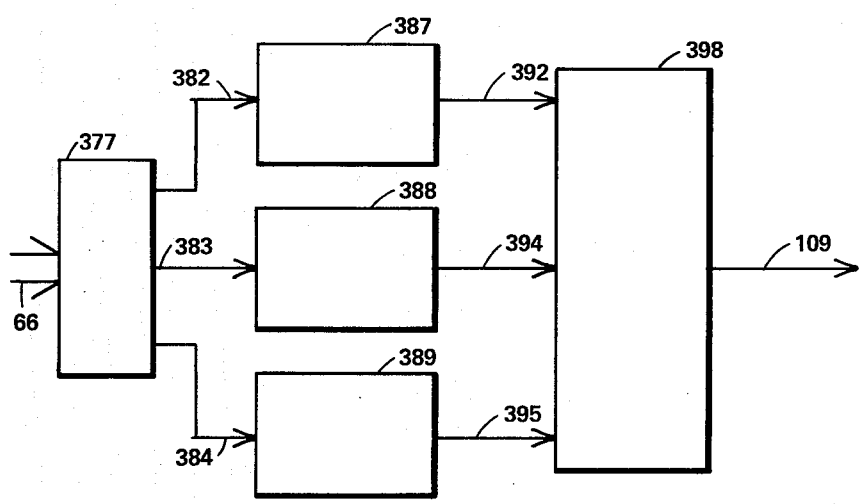
FIG. 6 is a more detailed block diagram of the sneak through detector of FIG. 2.

As shown in FIG. 6, the sneak through detector 106 includes a demultiplexer 377 connected to channel 66 which supplies each data bit to a plurality of outputs (only outputs to lines 382 through 384 are shown) such that as each data bit within a particular scan is received that data bit becomes the output to one of the lines (only lines 382 through 384 are shown). During the next scan, the data bit which occupies the same position as a particular data bit in the prior scan is outputted in the same line. For example, the first data bit in each scan becomes in turn the output to line 382 from demultiplexer 377. Lines 382 through 384 are connected to the inputs of counters 387 through 389, respectively. The counters 387 through 389 are identical and a detailed discussion of counter 387 suffices for all. Counter 387 counts the consecutive data bits which contain character information on line 382 until a count of four is reached. After counter 387 counts to four, its output to line 392 so indicates.

Additional data bits containing character information do not cause the counter to change its output to counter 392. However, when a data bit is received which does not contain character information (indicating that the particular photocell at that particular moment in time viewed background information) counter 387 is reset to zero. When the next data bit containing character information is received counter 387 counts one. Thus, in order for the output of counter 387 to line 392 to indicate four or more data bits containing character information, the data bits containing character information must be consecutive, i.e., the first data bit in four consecutive scans must contain character information.

Counters 388 and 389 have their outputs, which operate identically to the output of counter 387 to line 392, connected to lines 394 and 395, respectively. There will be as many of the plurality counters (only counters 387 through 389 are shown) as there are data bits in a scan, for example, in this particular embodiment where the scans provided by vertical analyzer 64 are 32 bits high, 32 counters are provided. The output of the counters are connected through lines (only lines 392, 394, and 395 are shown) to the inputs of a logic unit 398. Logic unit 398 can be of any well known configuration, for example, a plurality of NOR gates arranged such that if any of the inputs to logic unit 398 indicate that during at least four scans a particular position within the scans contain character information the output of logic unit 398 so indicates to channel 109. Alternately, the output of logic unit 398 to line 109 could indicate when none of the positions within the scans of data bits within the binary stream contain character information in a particular position within the scans for four consecutive scans.

Figure 7:
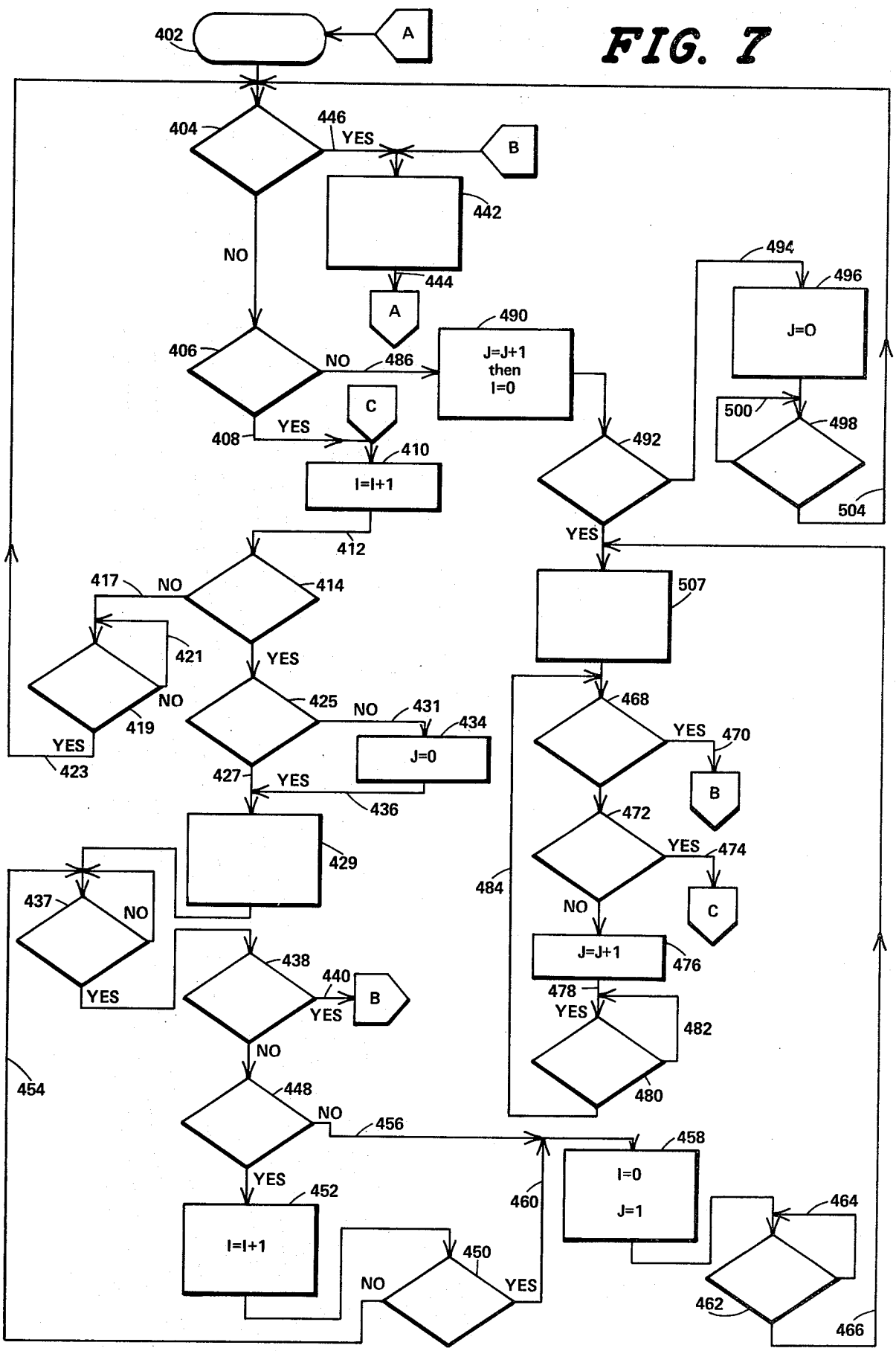
FIG. 7 is a logic diagram of one of the segment generators of FIG. 2.
Figure 8:
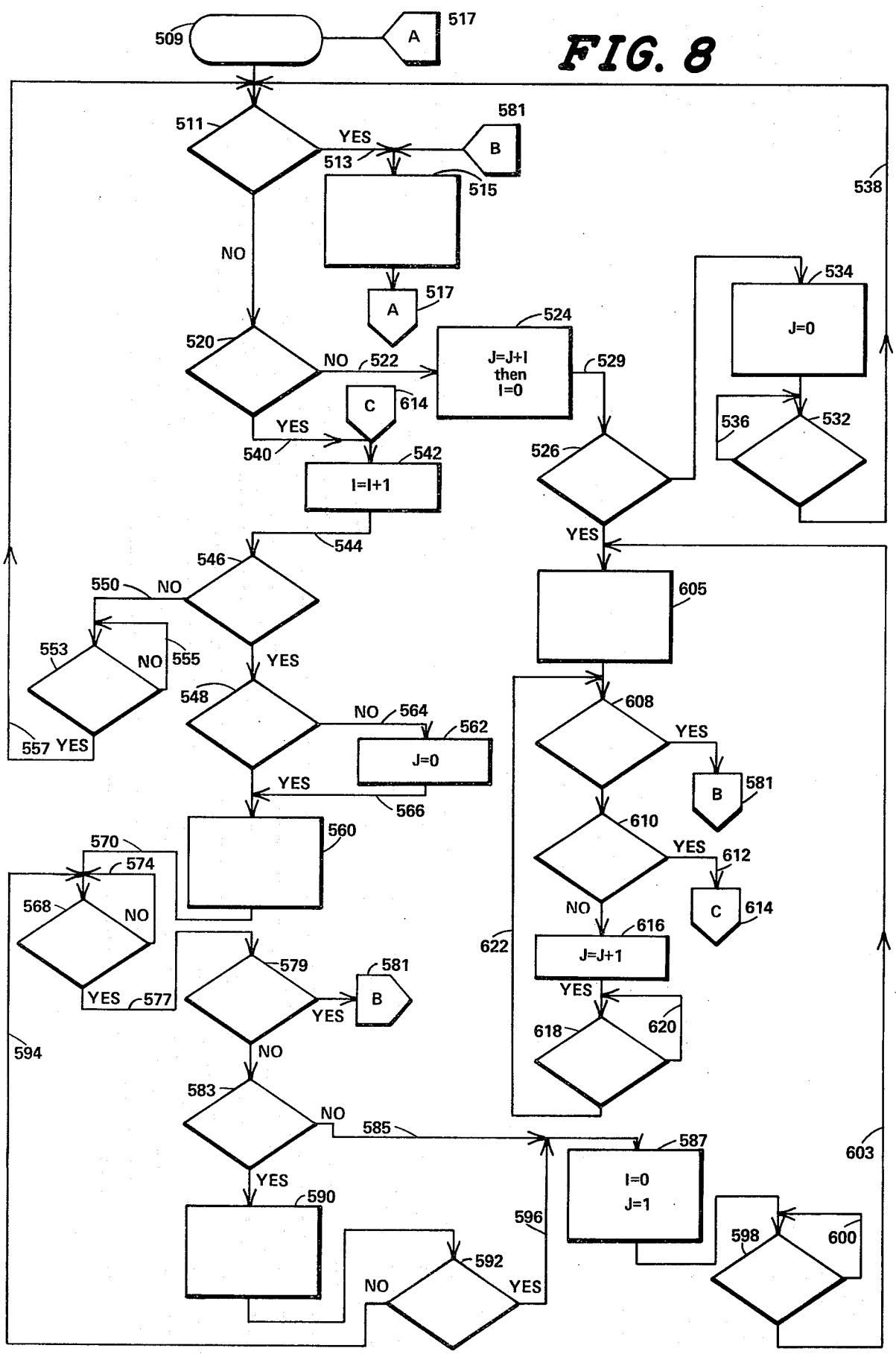
FIG. 8 is a logic diagram of another segment generator shown in FIG. 2.

The functions of segment generators 122 and 124 are shown in FIGS. 7 and 8, respectively. Since the operation of segment generator 124 is similar in nature to the operation of segment generator 122 as shown in FIG. 7 only segment generator 122 is discussed in detail here below followed by a brief discussion of the function of segment generator 124 as shown in FIG. 8.

In state 402, segment generator 122 is initialized and integers I and J are set to zero. Logic then proceeds to state 404. During state 404, segment generator 122 determines if the indication for a particular scan from processor 88 is an end of line indication. If this is not an end of line indication, the logic proceeds from state 404 to state 406. In state 406 segment generator 122 awaits the determination from scan detector 112 whether or not this particular scan meets the criterion of the scan detector. If the scan does meet the criterion of scan detector 112 so indicated through channel 116, the logic proceeds through path 408 and enters step 410. The interger I is incremented by one and the logic proceeds from step 410 through path 412 and enters into state 414. Within state 414, test are made to determine if I is equal to four. If I is not equal to four, then logic proceeds through path 417 and enters into state 419. In state 419 if the scan detector 112 does not indicate that a new scan has been examined, the logic cycles through path 421 and reenters state 419. When a new scan has been examined by scan detector 112 and indicated as meeting or not meeting the criterion of the scan detector through channel 116 to segment generator 122, logic proceeds through path 423 and reenters state 404 where the logic proceeds as discussed above.

If while the logic is in state 414 it is determined that I is equal to 4, i.e., four consecutive scans have met the criterion utilized by scan detector 112, the logic passes from state 414 and enters into state 425. In state 425 a check is made to determine if this is the first character segment of a line. If it is the first character segment of a line, logic passes through path 427 and enters into step 429. If this is not the first character segment of the line, logic passes through path 431 and enters steps 434. While in step 434 segment generator 122 places the previous space segment into memory 130. The number of scans in the space is represented by J in the flow diagram of FIG. 7 which is an integer representing the number of scans making up the space. J is then set to zero in step 434. The logic then passes through path 436 and enters step 429. In step 429 segment generator 122 declares a valid character segment (C). The logic then exits step 429 and enters into state 437. While in step 437 a test is made to determine if scan detector 112 has examined the next scan. If scan detector 112 has not completed its examination of the next scan the logic recycles and enters step 437. After the next scan is examined, the logic proceeds to state 438. Then state 438 of segment generator 122 examines the output of processor 88 to determine if a end of line indication has been received thereby. If an end of line indication has been received, the logic goes through path 440 and into step 442. Segment generator 122 writes the last character segment or space as appropriate into memory 130 during step 442. The logic then proceeds from step 442 through path 444 and reenters state 402. The logic then proceeds as discussed above. If the end of line indication occurs while the logic is in state 404, the logic proceeds through path 446 into step 442.

If while the logic is in state 437, the end of line indication is not received the logic proceeds onto state 448. In state 448, the output of the scan detector 112 is examined to determine if the scan detector has determined that this scan currently being received meets its criterion. If the scan does meet the criterion the logic proceeds from state 448 and enters state 450 after passing through step 452. In step 452, the interger I is incremented by one, i.e., I=I+1. The logic then proceeds from step 552 entering into state 450. In state 450, the output of the sneak through detector 106 is examined to determine if sneak through has occurred, i.e., the absence of one position of data bits containing character information for four consecutive scans. If the sneak through detector 106 does not indicate that sneak through has occurred, the logic goes through path 454 and reenters state 437 and the logic proceeds as discussed above. If in 448 the output of scan detector 112 indicates to segment generator 122 that the character segment did not meet the criterion of the scan detector 122, the logic proceeds from state 448 through path 456 and enters step 458. Further, if sneak through was detected in step 450, logic proceeds through path 460 and enters into step 458. In step 458 the length, i.e., the number of scans in the character segment, is written into memory 130 by segment generator 122. That is, the width of the character segment represented by the interger I in the flow diagram of FIG. 7 is written into the memory and thereafter the interger I is reset to zero. The interger J is set equal to one.

From step 458 the logic proceeds and enters into state 462 wherein the next indication that a scan has or has not met the criterion from scan detector 112 is awaited. If the next scan is not received after logic enters state 462, the logic cycles through path 464 to reenter state 462. After the next scan has been examined by scan detector 112, the logic proceeds through path 466 and enters state 468 through step 507. In state 468 it is determined if the scan is an end of line indication as determined by unit 95. If an end of line indication is received, then logic proceeds through path 470 and enters into step 442. The logic proceeds as discussed above. If while in state 468 the scan is not an end of line scan, the logic proceeds onto state 472. In state 472 if the scan meets the criterion of scan detector 112, the logic proceeds through path 474 and enters into step 410. If the scan does not meet the criterion thus indicating the scan is all or part of a space between character segments, the logic proceeds onto step 476. In step 476 the interger J is increased by one, i.e., J=J+1. Logic then proceeds through path 478 enters into state 480. In state 480 if a new scan has not been examined by scan detector 112, the logic cycles through path 482 and reenters state 480. After a new scan is examined by scan detector 112, the logic proceeds through path 484 and reenters state 468. Thereafter the logic proceeds as discussed above.

If while the logic is in state 406, the scan does not meet the criterion of scan detector 112 the logic proceeds through path 486 and enters step 490. In logic step 490, J is set equal to J+I. Then I is set to equal zero. The logic then proceeds from step 490 and enters state 492. In state 492, the segment generator determines if a character segment has occurred for this line. If a character segment has not occurred for this line, then logic proceeds through the path 494 and enters step 496 wherein the interger J is set equal to zero. After step 496 the logic proceeds and enters into state 498. Within state 498 scan detector 112 is monitored by segment generator 122 to determine if scan detector 112 has examined a new scan. If scan detector has not examined a new segment, the logic cycles through path 500 and reenters state 498. If the scan detector 112 has examined the next scan, then the logic proceeds through path 504 and the logic continues as discussed above. If a character segment has occurred during the examination of the binary stream comprising this line, the logic proceeds from state 492 and enters into step 507. In step 507 a space is declared. The logic then moves from step 507 and enters into state 468 and proceeds as discussed above. Thus, in relation to FIG. 7 the function of segment generator 122 is set forth above. The particular components and controllers, etc., necessary to implement the flow diagram as discussed above are a matter of design choice. One means of implementing the flow diagram is described in an article appearing in the Feb. 1, 1973 edition of "Electronic" by Charles L. Richards on pages 107-113 and entitled "An Easy Way To Design Complex Program Controllers".

FIG. 8 illustrates the logic implemented into segment generator 124. The initialization is performed and the system awaits the start of a line signal from processor 88 in state 509. Also, in state 509 intergers I and J are set to zero. The logic proceeds from state 509 and enters state 511. In state 511 the output of processor 88 is examined by segment generator 124 to determine if the end of line signal has been received by scan detector 114. If the end of line indication has been received, logic proceeds through path 513 and enters step 515. In step 515 and the last segment is written into memory 135 by segment generator 124. The logic then enters node 517 and thereafter reenters state 509. If while in state 511 the end of line indication is not received, the logic proceeds onto an state 520. In state 520 the segment processor awaits the decision from scan detector 114 indicating whether the character does or does not meet the criterion. If a scan does not meet the criterion the logic moves through path 522 and enters into step 524. In step 524 the interger J is set equal to the interger J plus the interger I and then I is reset to zero. From step 524 the logic proceeds to state 526 through path 529. In state 526 if a character segment has not occurred for this line, the logic passes from state 526 and enters into state 532 after passing through step 534. In step 534, J is set equal to zero and in state 532 if the next scan from vertical analyzer 64 has not been examined by scan detector 114, the logic cycles through path 536 and reenters state 532. After the new scan has been examined by scan detector 114 the logic proceeds through path 538 and reenters state 511 and the logic proceeds as discussed above.

If while the logic is in state 520, the segment generator 124 receives a signal from scan detector 114 that the character scan does meet the criterion of scan detector 114 (as discussed), logic moves through path 540 and passes through step 542 and path 544, and enters into state 546. In step 542, the interger I is incremented by "one", i.e., I=I+1. The logic exits step 542 and moves through path 544 to enter into state 546 wherein a test is made to determine if I is equal to 4. If I is equal to 4, the logic proceeds to state 548. If while the logic is in state 546 I is not equal to 4, the logic proceeds through path 550 and enters into state 553. If while the logic is in state 553, the scan detector 114 has not completed its examination of the next scan the logic moves through path 555 and reenters state 553. When the scan detector 114 has examined the next scan and indicates whether or not it meets the criterion to segment generator 124, the logic proceeds through path 557 and enters state 511 and the logic proceeds as discussed above.

While the logic is in state 548 if this is the first character segment of a line, the logic proceeds to step 560. If this is not the first character segment of a line, i.e., the first occasion that I has been equal to 4, the logic proceeds to step 562 through path 564. In step 562 the integer J is written into the memory 135 as a space and J is set to zero. The logic then proceeds to step 560 through path 566. In step 560, a valid character segment is declared and the logic proceeds onto state 568 through path 570. In state 568 segment generator 124 awaits the examination by scan detector 114 of the next scan. If the next scan has not been examined, the logic goes through path 574 and reenters state 568. When the new scan has been examined by scan detector 114, the logic proceeds through path 577 and enters state 579. In state 579 the determination is made if the processor 88 has received an end of line indication from vertical analyzer 64. If such an indication has been received, logic moves through node 581 and enters into step 515. The logic then proceeds as discussed above. If such indication is not received, the logic passes from state 579 and enters into state 583.

In state 583, the segment generator 124 determines whether or not the scan detector 114 indicates whether the scan meets the criterion or the scan does not. If the scan does not meet the criterion, the logic proceeds through path 585 and enters into step 587. If the scan does meet the criterion of scan detector 114, the logic proceeds from step 583 and enters into step 590. In step 590 the interger I is incremented by one, i.e., I=I+1. Logic then proceeds from step 590 to state 592. In state 592 segment generator 124 determines through line 109 if the detector 116 has detected the sneak through condition as discussed above. If sneak through was not detected the logic proceeds through path 594 and reenters state 568 and the logic proceeds as discussed above. If sneak through was detected, the logic proceeds through path 596 from state 592 and enters step 587.

In step 587 the segment generator 124 writes the number of scans which comprise the current character segment into the memory 135. The length of the character segment is equal zo the current value of the interger I. After the character segment is written into memory, interger I is set equal to zero and the interger J is set equal to one. The logic then proceeds from step 587 and enters state 598. Within state 598 if the next scan has not been examined by scan detector 114 the logic cycles through path 600 and reenters state 598. After the scan detector 114 indicates that the scan has been examined, logic moves through path 603 and enters step 605. If while the logic was in state 526 and character segment had occurred for this line, logic would have proceeded from state 526 and entered into step 605. In step 605, segment generator continues or commences a valid space. The logic continues from step 605 to state 608. In state 608, segment generator 124 examines the output of processor 88 to determine if an end of line indication has been received. If the processor has not received an end of line indication, logic proceeds from state 608 and enters into state 610. If on the other hand while in state 608 processor 88 has received an end of line signal from vertical analyzer 64 through unit 95, the logic proceeds from state 608 through node 581 and enters into step 515 from which logic proceeds as discussed above.

In state 610 the output of scan detector 114 is observed by segment generator 124 to determine if the scan is a space scan, i.e., the criterion of scan detector 114 is not met. If the criterion is met the logic proceeds through path 612 and enters into step 542 after passing through node 614. If the scan does not meet the criterion of scan detector 114, logic moves from state 610 and enters into step 616. In step 616 the interger J is incremented by one, i.e., J=J+1. Logic then proceeds to state 618 wherein the examination of the next scan by scan detector 114 is awaited. If the next scan has not been examined the logic cycles through path 620 and reenters state 618 until the scan has been examined. The logic then proceeds through path 622 and reenters state 608. Thus, the function of the segment generator 124 is explained in detail herein and can be implemented by any well known design means by any number of combinations of discreet logic components.

It should be noted that both the segment generators 122 and 124 place within each space the number of scan without any character information as determined by detector 101 (FIG. 2).

Figure 9:
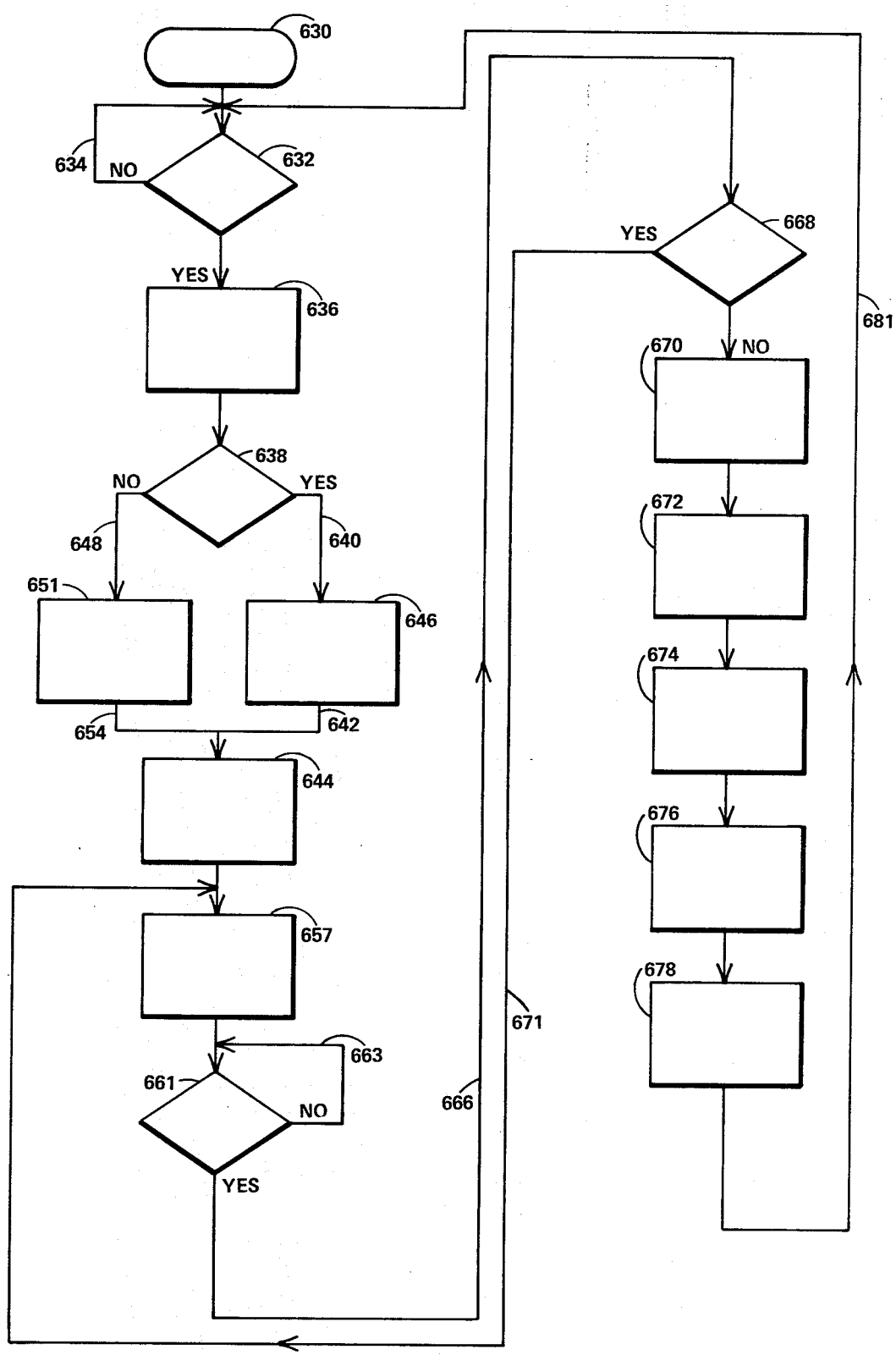
FIG. 9 is a logic diagram of the function of the processor of FIG. 2.

The processor 88 follows the logic shown in FIG. 9 during its operation upon the data derived from a line of characters. The segment processor 88 is initialized and ready for operation while in state 630. Logic then proceeds from state 630 and enters state 632. The segment processor 88 in state 632 awaits the end of line signal from unit 95 (of course, the end of line signal are ultimately from vertical analyzer 64). If the end of line indication is not received the logic cycles through path 634 and enters state 632. After the end of line indication is received while the segment processor is at state 632 the logic continues from state 632 to state 636. The segment processor 88 in step 636 computes the average number of data bits per scan over the entire line utilizing the following equations: BAV=data bits containing character information divided by the total number of scans. Logic then proceeds from step 636 and enters into state 638. In state 638, the value of BAV (the average number of data bits containing character information) is tested to determine if it is greater than or equal to four. If the value of BAV is found to be greater than or equal to four the logic proceeds through path 640 and 642 and enters into step 644 after passing through step 646. In step 646 segment processor 88 accesses memory 135 and ignores the information located in memory 130. The processor also instructs arithmetic unit 152 to utilize the information stored in storage unit 148 and ignore the information stored in unit 146. If while in state 638 the value of BAV is found not to be equal or exceeding four, the logic proceeds through path 648 and enters into step 651. In step 651 the processor 88 addresses the segment stored in memory 130 and instructs the arithmetic unit 152 to select the segments stored in storage unit 146 rather than those segments stored in storage unit 148 for its calculations. It should be noted that memories 130 and 135 also contain the number of scans which do not contain any data bits containing character information as detected by detector 101, i.e., the spaces between the character segments. The logic then proceeds from step 651 through path 654 and enters step 644.

In step 644, the processor 88 receives the recycle number calculated by the arithmetic unit 152 based on the character segments stored in either storage unit 146 or 148 as selected by the processor 88 (as discussed above). The recycle number is received from the arithmetic unit 152 by the processor 88 through channel 163. Logic then proceeds from step 644 and proceeds onto step 657. In step 657, processor 88 combines the first character segments stored in storage unit 130 or 135, as selected, which was first generated by the segment generators associated therewith. If the segments in memory 130 have been selected, for example, then the first character segment compiled by segment generator 122 is combined with the second character segment generated by segment generator 122 and the space there between. The sum of the number of scans of the first and second character segments in the space there between are tested to determine if they exceed the recycle number. If the combination does not exceed the recycle number, then the third character segment generated by segment generator 122 and the space there between is added to the prior sum and this is then tested against the recycle number. The inhibit rules of Table I apply to prevent the combining of adjacent character segments if the space there between contains a certain predetermined number of scans without any character information based on the BAV. Although the inhibit rules may vary somewhat from application to application, distribution of Table I has been found to be particularly useful. Table II sets forth character segments with spaces there between and the number of scans without character information within each space. Assuming that the recycle number is equal to 30 and the average number of data bits containing character information per scan is equal to five what follows is a description of the combination process of the processor 88.

Table II

| Character Segment (C) And Spaces (S) | No. of Scans | |
|---|---|---|
| C1 | 15 | |
| S1 | 4 | |
| C2 | 10 | |
| S2 | 2 | |
| C3 | 9 | |
| S3 | 3 | (1 scan without) |
| C4 | 8 | |
| S4 | 1 | |
| C5 | 8 | |
| S5 | 4 | |
| C6 | 10 | |
| S6 | 4 | (2 scans without) |
| C7 | 8 | |

Table II shows a sample distribution of character segments and spaces derived by either segment generator 122 or segment generator 124 as selected for use by processor 88. C1 is the first character segment generated by the segment generator and stored into its associated memory. As S1 represents the space between C1 and C2 and character segment C2 is the second character segment generated by the segment generator and so forth. C1 and C2 can be combined with S1 to form a combined character of 29 scans which does not exceed the recycle number 30. The addition of S2 and C3 would give a combined character 40 scans which exceeds the recycle number 30. Therefore the first combined character segment (CC1) is equal to 29 scans which is C1 plus S1 plus C2. The first space (CS1) of the combined character series is identical to S2 which is comprised of two scans. C3, S3, and C4 are combined to form a combined character of 20 scans which does not exceed the recycle number. However, there is a scan in S3 which does not contain character information. Looking at Table I of BAV values above, it is found that for a BAV of five utilizing this example two scans without any character information within a space are required to inhibit the recycle. Therefore, C3, S3 and C4 can be combined.

Next the processor combines S4 and C5 to determine if the sum exceeds the recycle number. The sum of C3, S3, C4, S4 and C5 is equal to 29 and does not exceed the recycle number. However, the addition of S5 and C6 would exceed the recycle number. Therefore, the second combined character (CC2) is comprised of 29 scans. The second space in the combined character series (CS2) is equal to four scans which is the value of S5. C6, S6, and C7 could be combined to form a combined character of 22 scans. However, S6 has two scans which do not contain any character information. Therefore, because of the inhibit rules set forth in Table I C6, S6 and C7 cannot be combined. Therefore, the third combined character segment CC3 is equal to 10. The next space (CS3) in the combined character series is equal to four scans and the fourth combined character (CC4) begins by attempting to combine C7 with whatever space and character segment follows thereafter if allowed by the inhibit rules. In this simple example (other examples are discussed in detail hereinafter in connection with FIGS. 12 through 23) it is shown the simplified operation of the processor 88 in performing the combined operation required in step 657. The series of combined character segments and the spaces there between are stored into temporary storage unit 173 and temporary storage units 160 and 161.

From step 657 the logic proceeds to and enters into state 661. In state 661 the processor 88 awaits the calculation of a new recycle number from arithmetic unit 152 through channel 163. This recycle number calculated by arithmetic unit 152 is based on the combined character segments and the spaces there between stored in temporary storage units 160 and 161. If a new recycle number is not received from the arithmetic unit 152, the logic cycles through path 663 and reenters state 661. After a new recycle number is received from the arithmetic unit, the logic proceeds through path 666 and enters state 668. The processor 88 then compares the new recycle number against the last recycle number to determine if any change has taken place within state 668. If the new recycle number is substantially identical to the old recycle number, the logic proceeds to step 670. If the recycle number is changed, the logic goes through path 671 from state 668 and reenters step 657. The latest recycle number is utilized to form new combined character segments but the character segments utilized are the original character segments stored in either memory 130 or 135 as selected from the average number of data bits containing character information per scan as discussed above.

In step 670 the processor calculates the suspect character width (SCW) and the natural break minimum (MBMIN) and maximum (NBMAX) values. (This could of course be performed by the arithmetic unit 152 and its calculation by the processor 88 is a matter of design choice.) The suspect character width (SCW) is equal to the average character segment width (ACS) plus the average combined character segment width (ACS) divided by the standard deviation (SD) of the combined character segments. The average character segment width is computed from the combined character segments stored in temporary storage unit 173. The standard deviation (SD) whose formula is given above is also calculated based on the combined character segments stored in memory 173. (If the suspect character width is to be computed by the arithmetic unit 152 then the combined character segments which are stored in temporary storage unit 160 and 161 would be utilized, although these combined character segments are of the same length and are in fact identical to those stored in memory 173.) The natural break minimum (NBMIN) is calculated by the following formula:

$$NBMIN = 2 \times ACS - SD - P$$

where P is equal to the number of combined character segments having a width of scans greater than ASC plus SD. The natural break maximum (NBMAX) value is calculated from the following formula:

$$NBMAX = 2 \times ACS + S - P$$

where P is the number of combined character segments having a width greater than ACS plus SD. After the suspect character width and the natural break maximum minimums have been calculated the logic proceeds from step 670 to step 672. In step 672 processor 88 utilizes the suspect character width and the natural break maximim minimums calculated in step 670 within a combined character recovery procedure.

In the combined character recovery procedure each combined character segment of the series ($CC_1$, $CC_2$ ... $CC_n$) are examined to determine if any of the combined characters are equal to or greater than the suspect character width (SCW). In step 672 after the suspect character width and the natural break minimum and maximums have been calculated, the processor 88 determines if any of the combined characters segments ($CC_1$ through $CC_n$) are greater than or equal to the suspect character width. If any of the combined characters are greater than or equal to the suspect character width, then the processor reverses backward and forward to determine if the adjacent combined character segments and the space there between can be combined within the range of natural break maximum and natural break minimum. Processor 88 first combines the combined character segment which is greater than the suspect character width with adjacent combined character segment by processor 88 formed prior to the combined character segment, which exceeds the suspect character width, and the space there between to determine if the sum of the combined characters and the space there between is within the range of natural break minimum and maximum. In other words, if $CC_i + CS_i - 1 + CC_i - 1$ is within the range of natural break maximum and minimum, processor 88 adjusts the combined character segments as if each combined character segment has the same width and allowing a space of one scan if the combined width is an odd number.

If $CC_i - 1 + CS_i - 1 + CC_i$ is not within the inclusive range of natural break minimum or maximum the processor 88 combines the combined character segment ($CC_i$), which is greater than SCW, with the combined character segment formed subsequent to the combined character segment ($CC_i + 1$), which is greater than or equal to the suspect character width, and the space ($CS_i$) there between. If the sum of the combined character segment ($CC_i + CS_i + CC_i + 1$) is within the inclusive range of the natural break minimum and maximum, then the two combined character segments are adjusted as if each character has the same width and allowing an $S_i$ of one scan width is an odd number. Once this operation is completed for all of the character segments greater than or equal to the suspect character width, the logic proceeds from step 672 and enters into step 674.

In step 674 each combined character segment ($CC_1$) is compared with the natural break minimum to determine if any of the combined character segments are greater than the natural break minimum. If any combined character segment is greater than the natural break minimum, the combined character segment is broken into two characters of equal width allowing a space of one scan if the character segment had a width which was an odd number. The logic then proceeds to step 676 after all the combined character segments have been compared with the natural break minimum. Once the logic enters into step 676, processor 88 begins to perform a delimiter function whose purpose is to determine which of the spaces between the combined character segments ($CS_i$) are voids between words rather than gaps between characters within the same word. Processor 88 first computes a delimiter value (D) utilized in the following formula:

$$D = 2 \times AVS + T$$

where AVS is the average space width for spaces less than or equal to 30 and T is the standard deviation. Thus, T is equal to the square root of the sum of the squared widths of the spaces minus the number of spaces times the average space width squared divided by the number of spaces.

$$\frac{(\text{Sum of space widths})^2 - \text{No. of Spaces} \times (AVS)^2}{\text{No. of spaces} - 1}$$

The delimiter value calculated is then used to declare all of the spaces ($CS_i$) in the combined character series greater than 14 scans and also greater than D as a void between words. Processor 88 stores the calculated delimiter value, the suspect character width the minimum and maximum break, and any other numbers within the temporary storage unit 174. The adjustments of the centers of the characters and the breaking apart of some of the combined character segments and the declaration of certain spaces as voids between words rather than gaps between characters within the same word are all properly loaded into temporary storage unit 173 under the control of the memory control unit 184.

After the process discussed above is completed within step 676, the logic then proceeds to step 678. While the logic is in step 678, processor 88 informs the memory control unit 184 that the operation is complete. Memory control unit 184 then informs the character recognition unit 75 (FIG. 1) via channel 77 that the system for character presence detection 70 has completed its tasks and that the characters have been located within the data stream stored within the line memory 68. When the character recognition unit is prepared to receive the video stored within line memory 68 and the information loaded into the temporary storage unit 173 concerning the locations of the characters within the data stream which are stored within line memory 68, the memory control unit 184 causes line memory 68 to output the binary data stream stored therein through channel 73 to the character recognition unit 75 (FIG. 1). At the same time memory control unit 184 (FIG. 2) outputs the information concerning the locations of the characters within the data stream stored within unit 173 through channel 77 to the character recognition unit 75. Once the processor 88 informs the memory control unit 184 that the system for character presence detection has completed its location of the characters within the data stream, the logic of processor 88 proceeds through path 681 and reenters state 632 and the logic proceeds as discussed above.

Figure 10:
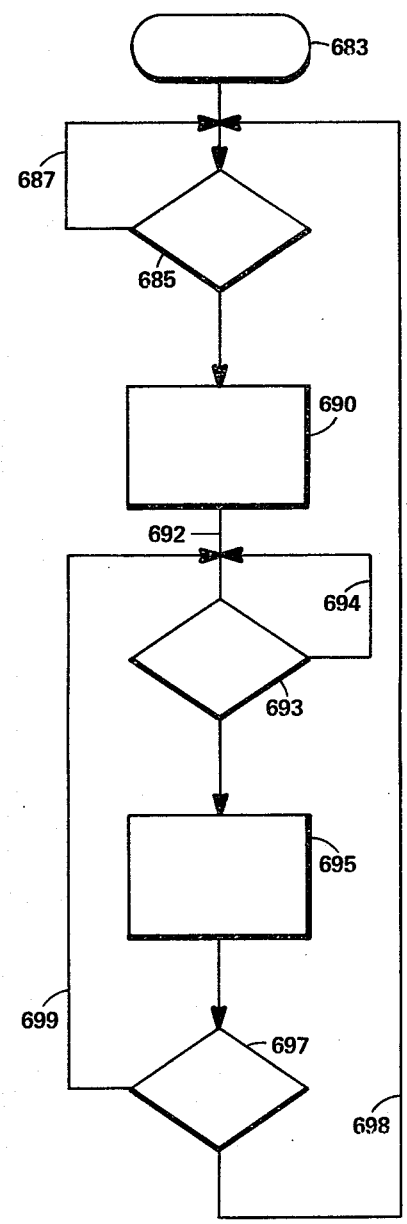
FIG. 10 is a logic diagram of the arithmetic unit calculation of the recycle number.
Figure 14:
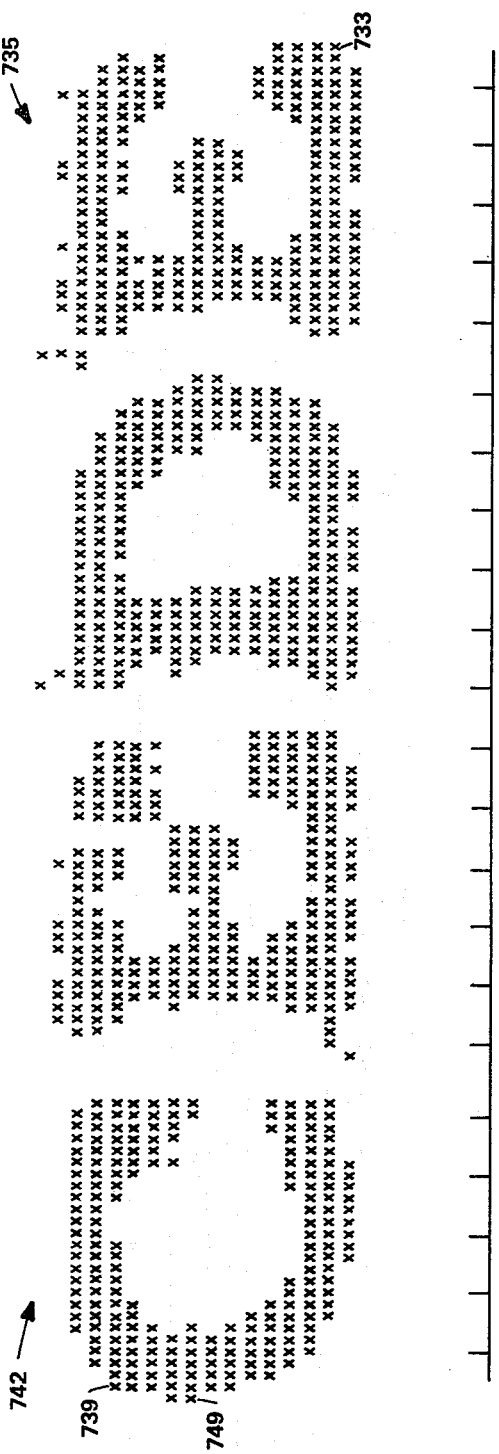
Figure 15:
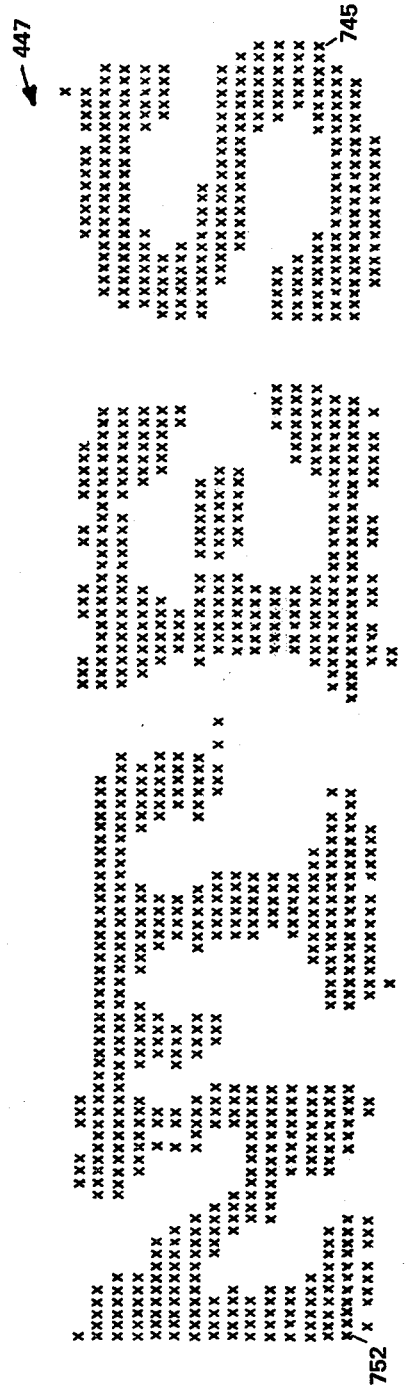
Figure 16:
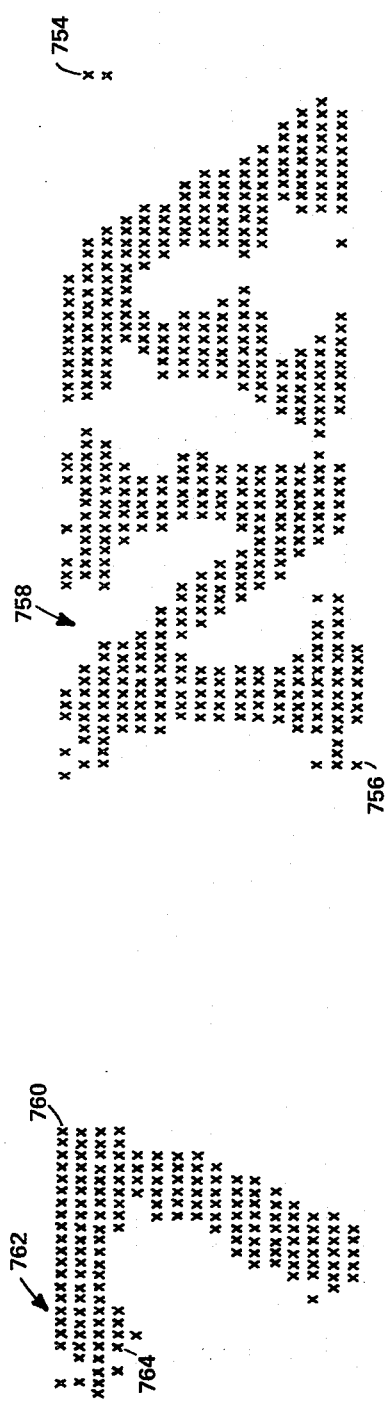

As shown in FIG. 10, the logic of arithmetic unit 152 begins in state 683. The arithmetic unit 152 initializes in state 683 and the logic proceeds to state 685. In state 685, the arithmetic unit awaits signals and the BAV value from processor 88. If the signals are not received the logic goes through path 687 and reenters state 685. After the signals are received indicating that the series of character segments stored in either unit 146 or 148 are complete and a selection signal indicating which series to utilize, the logic goes from state 685 and enters 690. In step 690, the recycle number (RC) is calculated from the following formula:

$$RC = (10 - BAV) + ACW + SD,$$

where BAV is the average number of data bits containing character information per scan and ACW is the average character segment width and SD is the standard deviation, excluding character segments less than 8 scans wide.

The recycle number is transferred to processor 88, and the logic moves through path 692 and enters state 693. In state 693, the arithmetic unit 152 awaits a signal from processor 88 that this iteration of combined character separation is complete. If the signal is not received, the logic cycles through path 694 and enters state 693 until the signal is received. After the signal indicating this iteration of the combined character operation is complete, the logic proceeds to step 695. During step 695, the arithmetic unit 152 calculates a new recycle number utilizing the above formula but with the combined character segments in units 160 and 161 being utilized rather than the character segments stored in either units 146 or 148. In state 697, into which the logic enters after step 695 is complete, the arithmetic unit awaits a signal from processor 88 that the recycle operation is complete, i.e., that the newly calculated recycle number is approximately equal to the previous recycle number. If the recycle numbers are approximately equal, the logic moves through path 698 and enters state 685, and the logic proceeds as discussed above. If the recycle operation is not complete, the logic goes through path 699 and reenters state 693.

FIGS. 11 through 22 are examples of video produced by vertical analyzers 64 (FIG. 2). FIGS. 11 and 12 comprise a short line of relatively "clean" video. FIGS. 13 through 17 comprise a second line of relatively "clean" video. The two lines of video are utilized as examples in discussing generally the function of the system for character presence detection 70 (FIG. 2). FIGS. 18 through 22 comprise a line of "degraded" video. This is video that is extremely difficult to read by most character recognition systems without knowledge of the location of the center of the characters. The function of the system for character presence detection 70 is discussed in conjunction with FIGS. 18 through 22 to describe the operation of the system on video which is extremely difficult to locate the character centers. Each data bit which contains character information in each scan of the lines is represented by an "X", for example, in FIG. 11 the rightmost scan (represented by the numeral 700 as four adjacent data bits which contain character information).

Although the system for character presence detection does locate the character centers and provides information concerning the width thereof to the character recognition unit, other forms of transfer of the information from the system for character presence detection could be utilized, for example, providing the beginning and ending scans of the character thus by implication directing the character recognition units attention to the center and width of the character. The binary stream which is stored in memory 68 from analyzer 64 is comprised of ones and zeros. If, for example, the zeros represent background, the ones represent character information but the reverse could be true.

The video shown in FIGS. 11 through 22 is comprised of 32 data bits per scan. The location of every fifth scan is generally described by a spike preferably extending from the line drawn beneath the video. These spikes are of no particular significance except to aid the location of certain particular scans during the discussion herein. The video in FIGS. 11 through 22 is a result of scanning a written medium 32 as described above in connection with FIG. 1 and the character recognition system 44.

Certain scans which do not have any data bits containing character information therein have been omitted between characters, for example, the last scan of the character 702 FIG. 11 is separated by 30 scans from the first scan 704 of the character 706 of FIG. 12. Although it should be noted that scan 704 does not meet either of the criterion of the scan detectors 112 and 114. Scan 704 could be utilized however when attempting the character recognition by the character recognition unit 75. Scan 700 will qualify under both criteria because there are four adjacent data bits containing character information which satisfies both the 3 of 5 and the 2 of 6 criterion. The first scan of the line shown in FIGS. 11 and 12 containing character information is scan 708 of character 710. The results of the segment generators 122 and 124 are stored into memories 130 and 135. The results of the total count of the cell counter 82 which counts the total number of data bits containing character information including the single data bit in scan 708 which contains character information to produce the total number of data bits in the entire scan which contain character information. The scan counter 90 produces the total scan count which in this example set forth herein is 370 scans. When the total number of scans is divided into the total number of data bits containing character information produced by counter 82 this gives an average data bits per scan of three. Thus, the character segments compiled from the two of six criterion utilized in scan detector 112 by segment generator 122 and stored into memory 130 are selected by the processor 88. Further, the arithmetic unit 152 selects the character segments stored in 146 to calculate the recycle number in response to processor 88. The information stored in the memory 130 from segment generator 122 is as follows:

acter segment ($C_2$) 112 and the space ($S_1$). This would produce a sum of scans equal to 51. This sum is greater than the recycle number 34. Thus, the two character segments are not combined. Character segment 712 ($C_2$) was then attempted to be combined with character segment ($C_3$) 720 which is adjacent thereto. This would also produce a sum which is greater than the recycle number. The sum of combining character segment ($C_2$) 712, segment ($C_3$) 720, and space ($S_2$) is 55 scans. Further, there are four scans which do not contain any character information between the character segments ($C_2$ and $C_3$) 712 and 720, and they could not be combined in any event because of the inhibit rules as discussed above. Inhibit rules would also apply to combining character segment ($C_4$) 706 with character segment ($C_3$) 720 (because of the scans which do not contain character information) and in any event the combination would be greater than the recycle number. This is also true of attempted combination of character segment ($C_4$) 706 with character segment ($C_5$) 702 (FIG. 11). Thus the results of the combined characters as shown above in the same result as shown in Table III. When arithmetic unit 152 addresses the combined character segments (which are equal to the original character segments stored in memory 130) the segments stored in storage units 160 and 161 are equal to segments stored in unit 146. The arithmetic unit 152 then calculates the recycle number which will also be equal to the 34 because the combined character segments are equal to the character segments and therefore the results must be the same.

The processor 88 then enters the combined character recovery mode as discussed above. The suspect character width (SCW) is calculated by processor 88, and is equal to 30. The maximum and minimum natural break numbers are 55 and 48, respectively. Applying the suspect character width (SCW) to the combined character segments which are 22, 27, 24, and 27 scans in width show that none of the combined character segments are greater than or equal to the suspect character width of 30. Thus, none of the character segments are adjusted as discussed above.

After applying the suspect character width, each

TABLE III

| Character Segments (C) | | Spaces (S) | | Combined Character Segments (CC) | | Spaces (CS) | | Combined Recovery Character Segments (CRC) | | Spaces (CRS) | |
|---|---|---|---|---|---|---|---|---|---|---|---|
| $C_1$ | 22 | $S_1$ | 2 | $CC_1$ | 22 | $CS_1$ | 2 | $CRC_1$ | 22 | $CRS_1$ | 2 |
| $C_2$ | 27 | $S_2$ | 4 | $CC_2$ | 27 | $CS_2$ | 4 | $CRC_2$ | 27 | $CRS_2$ | 4 |
| $C_3$ | 24 | $S_3$ | 33 | $CC_3$ | 24 | $CS_3$ | 33 | $CRC_3$ | 24 | $CRS_3$ | 33 |
| $C_4$ | 24 | $S_4$ | 33 | $CC_4$ | 24 | $CS_4$ | 33 | $CRC_4$ | 24 | $CRS_4$ | 33 |
| $C_5$ | 27 | $S_5$ | 99 | $CC_5$ | 27 | $CS_5$ | 97 | $CRC_5$ | 27 | $CRS_5$ | 99 |

Information shown in Table III is, for example, that character segment ($C_1$) 710 has a width of 22 scans and s separated from character segment 712 by a two scan space ($S_1$). Thus, all of the scans between scan 715 and scan 717 meet the 2 of 6 criterion utilized by scan detector 112. Because the average number of data bits containing character information per scan is equal to 3, four (4) scans which do not contain any character information inhibit the combination of character segments adjacent to the scan containing those scans without character information. The recycle number (RC) calculated is equal to 34. The numbers then apply to the various scans as discussed above. The first character segment 110 is attempted to be combined with the adjacent charcombined character segment ($CC_i$) is compared to the natural break maximum and minimum to determine if any of the combined character segments are greater than the natural break minimum. None of the combined character segments (which are 22, 27, 24, 24, and 27 scans in width in the natural break minimum which is 48. None of the combined character segments in this example is greater than the natural break minimum; therefore, no natural break is possible.

Next the processor 88 performs the delimiter function as discussed above. The delimiter value (D) for this example is 14. Thus, the spaces between character segments $C_3$, $C_4$ and $C_5$ are voids between character segments within different words and the remaining character segments are gaps between character segments of the same word. As the delimiter function is similar to some of the other calculations and procedures of the system for character presence detection 70 (FIG. 1), the delimiter function will only be discussed in connection with this particular example and is omitted from the discussion of FIGS. 13 through 22.

Figure 17:
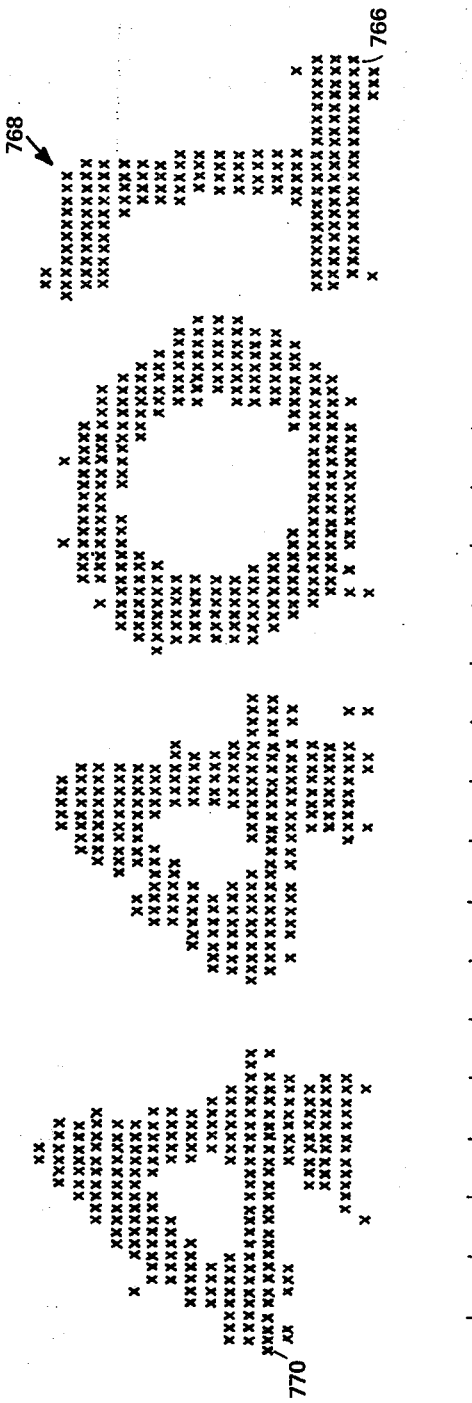

Another line of clean video is shown in FIGS. 13 through 17. This line of video has its first data bits in scan 724 (FIG. 13). The last scan 770 of video in this line of characters containing character information is shown in FIG. 17. The last scan 729 of character segment ($C_1$) 731 of FIG. 13 is separated by three scans from scan 733 (FIG. 14) which is the first scan of character segment ($C_2$) 735. Referring back to FIG. 13 the last scan of 737 containing character information of FIG. 13 does not qualify as a scan of a character segment because it only contains two widely spaced data bits having character information therein. This line of video contains 655 scans as determined by scan counter 90.

The number of scans between scan 729 and scan 733 (FIG. 14) is three including one scan 737 which contains character information but does not meet either of the criterion utilized by scan detectors 112 and 114. The leftmost scan of FIG. 14 of character segment ($C_4$) 742 is scan 739 which is separated by 31 scans from the rightmost scan containing character information 745 of character segment ($C_6$) 747 of FIG. 15. The last scan 749 of FIG. 14 which contains character information is separated by 30 scans from scan 745 but does not qualify under the criterion used by scan detectors 112 or 114. The leftmost scan of FIG. 15 which contains character information is scan 752 which is adjacent to scan 754 (FIG. 16) within the data stream. Scan 756 of character segment ($C_{11}$) 758 is separated from scan 760 of character segment ($C_{12}$) 762 separated by 36 scans. The scan 764 which is the last scan of character segment ($C_{12}$) 762 which qualifies under the the other criterion utilized by scan detectors as discussed above is separated from the first scan 766 of character segment ($C_{13}$) 768 which qualifies by 9 scans. Video then proceeds from scan 766 and ends with the last (leftmost) scan 770 of FIG. 17 containing character information. Scan 770 is the final scan which contains a data bit containing character information in this line of video.

TABLE IV

| Character Segments (C) | | Spaces (S) | | Combined Character Segments (CC) | | Spaces (CS) | | Combined Recovery Character Segments (CRC) | | Spaces (CRS) | |
|---|---|---|---|---|---|---|---|---|---|---|---|
| $C_1$ | 27 | $S_1$ | 3 | $CC_1$ | 27 | $CS_1$ | 3 | $CRC_1$ | 27 | $CRS_1$ | 3 |
| $C_2$ | 25 | $S_2$ | 4 | $CC_2$ | 25 | $CS_2$ | 4 | $CRC_2$ | 25 | $CRS_2$ | 4 |
| $C_3$ | 26 | $S_3$ | 3 | $CC_3$ | 26 | $CS_3$ | 3 | $CRC_3$ | 26 | $CRS_3$ | 3 |
| $C_4$ | 25 | $S_4$ | 6 | $CC_4$ | 25 | $CS_4$ | 6 | $CRC_4$ | 25 | $CRS_4$ | 6 |
| $C_5$ | 25 | $S_5$ | 31 | $CC_5$ | 25 | $CS_5$ | 31 | $CRC_5$ | 25 | $CRS_5$ | 31 |
| $C_6$ | 24 | $S_6$ | 5 | $CC_6$ | 24 | $CS_6$ | 5 | $CRC_6$ | 24 | $CRS_6$ | 5 |
| $C_7$ | 26 | S hd 7 | 5 | $CC_7$ | 26 | $CS_7$ | 5 | $CRC_7$ | 26 | $CRS_7$ | 5 |
| $C_8$ | 27 | $S_8$ | 1 | $CC_8$ | 27 | $CS_8$ | 1 | $CRC_8$ | 27 | $CRS_8$ | 1 |
| $C_9$ | 24 | $S_9$ | 3 | $CC_9$ | 24 | $CS_9$ | 3 | $CRC_9$ | 24 | $CRS_9$ | 3 |
| $C_{10}$ | 26 | $S_{10}$ | 3 | $CC_{10}$ | 26 | $CS_{10}$ | 3 | $CRC_{10}$ | 26 | $CRS_{10}$ | 3 |
| $C_{11}$ | 24 | $S_{11}$ | 36 | $CC_{11}$ | 24 | $CS_{11}$ | 36 | $CRC_{11}$ | 24 | $CRS_{11}$ | 36 |
| $C_{12}$ | 19 | $S_{12}$ | 9 | $CC_{12}$ | 19 | $CS_{12}$ | 12 | $CRC_{12}$ | 19 | $CRS_{12}$ | 12 |
| $C_{13}$ | 22 | $S_{13}$ | 2 | $CC_{13}$ | 22 | $CS_{13}$ | 2 | $CRC_{13}$ | 22 | $CRS_{13}$ | 2 |
| $C_{14}$ | 28 | $S_{14}$ | 8 | $CC_{14}$ | 28 | $CS_{14}$ | 8 | $CRC_{14}$ | 28 | $CRS_{14}$ | 8 |
| $aC_{15}$ | 20 | $S_{15}$ | 8 | $CC_{15}$ | 20 | $CS_{15}$ | 8 | $CRC_{15}$ | 20 | $CRS_{15}$ | 8 |
| $C_{16}$ | 23 | $S_{16}$ | 99 | $CC_{16}$ | 23 | $CS_{16}$ | 99 | $CRC_{16}$ | 23 | $CRS_{16}$ | 99 |

The results of the scan detector 114 are shown on table IV which presents the character segments ($C_i$) with the spaces ($S_i$) there between. The 3 of 5 ratio was selected because the average number of data bits containing character information per scan was equal to five. The processor 88 would then as discussed above select the 3 of 5 ratio and therefore the character segments and spaces stored in memory 135. The recycle number calculated for the character segments set forth in table IV is 31. As can be seen from Table IV, the combination of any of the character segments with adjacent character segments results in a number which exceeds the recycle number of 31. For example, character segment ($C_4$) which has a width of 25 scans when combined with the next scan character segment ($C_5$) and space there between, produces a sum of 56 scans which of course exceeds the recycle number 31. In another example character segment ($C_{11}$) 758 combined with character segment ($C_{12}$) 762 and space ($S_{11}$) gives the sum of 79 which of course exceeds the recycle number 31.

Therefore, the results of the combined character operation which are stored into temporary storage units 160 and 161 are identical to the character segment stored in memory 135. Therefore, the recycle number (RC) calculated by arithmetic unit 152 is identical to the previous recycle number of 31. When the newly calculated recycle number is compared by processor 88 to the old number, the processor 88 halts the recycle operation, because the two recycle numbers are approximately equal. The processor 88 utilizes the combined character segments stored in storage unit 173 to complete the combined character recovery operation as discussed above. The suspect character width (SCW) calculated by processor 88 is equal to 29 scans and the natural minimum and maximum calculated by the processor 88 are 43 and 53, respectively. The combined character segments are then compared with the suspect character width (SCW) 29 to determine if any of the combined character segments are greater than or equal to the suspect character width. As all of the combined character segments ($CC_i$) are less than 29 none of the character segments which would have become the combined character segments as shown in Table IV are greater than or equal to 29. For example, the first combined character segment (CC$_1$) 731 is equal to 27 and is therefore less than the suspect character width (SCW) of 29.

Having completed the suspect character operation, each combined character segment (CC$_1$) is compared to the natural break range to determine if a natural break is possible. The criterion utilized is as discussed above if any of the combined character segments (CC$_i$) is greater than natural break minimum (NBMIN). If any of the combined character segments are greater than the natural break minimum then this combined character segment is broken into two characters each of equal width. Because the natural break minimum (NBMIN) is equal to 43 and none of the combined character segments are greater than 43 (as shown in table IV) none of the combined character segments are broken into two characters of equal width. The processor 88 then moves onto the delimiter operation as discussed above in which the spaces which represent voids between words rather than gaps between characters are located utilizing the formula set forth above. This completes the discussion herein of the two lines of relatively clean video and shows in general the operation of the system for character presence detection 70 when presented with clean video from the vertical analyzer 64 on channel 66 (FIG. 2).

Although the discussions in connection with the clean video of FIGS. 11 through 17 are considered helpful and understanding the nature of the operation of the system and method for character presence detection as disclosed herein, the true value of this unique system and method for character presence detection is revealed when degraded video such as that shown in FIGS. 18 through 22 is presented by vertical analyzer 64 to the system for character presence detection 70 (FIG. 2). Further, the discussion above in connection with the clean video of FIGS. 11 through 17 although thorough has been deliberately brief and is merely preparatory to the detailed discussion of the operation of the character presence detection system 70 in connection with the video of FIGS. 18 through 22. However, the delimiter operation as discussed above is not discussed in connection with the discussion of degraded video set forth here below.

The first scan 775 of the line of video shown in FIGS. 18 through 22 qualifies under both the criterion utilized by scan detectors 112 and 114. However, the next scan 776 of FIG. 18 qualifies only under the two of six criterion utilized by scan detector 112. Next scan 778 also only qualifies under the criterion of scan detector 112. The next scan 781 qualifies under both the criterion utilized by scan detector 112 and 114. Since four scans have consecutively met the criterion utilized by scan detector 112, segment generator 112 issues a signal which indicates that a valid character segment is recognized as discussed above in connection with the segment generators 122 and 124. During the next three scans 784 through 786 are necessary to qualify the video contained in the preliminary scans of line of video represented by FIGS. 18 through 22 as a character segment (C$_i$) under the criterion utilized by scan detector 114. Thus, when the video representing the scan 786 is received by scan detector 114, and signals that the scan qualifies to segment generator 124, the segment generator 124 operates to qualify the video as a character segment as discussed. As the average number of data bits containing character information is determined to be equal to six only this particular criterion is utilized hereinafter in the discussion of FIGS. 18 through 22. Therefore, the beginning of the first character segment is at scan 781. The first character segment ends at scan 788 and thus includes 32 scans from and including scan 781 to and including scan 788. Next scan 790 does not qualify and thus the character segment is ended. The next scan which qualifies is scan 792 and the next three scans 794 through 796 also qualify and therefore a valid character segment is declared by segment generator 122 to be stored into memory 130. The last scan of this character segment is scan 798. Since none of the positions of the data bits within the scans have four consecutive adjacent scans to scan 798 contained character information, the sneak through detector 106 so signals to scan detector 124 and the character segment is terminated.

Figures 18, 19:
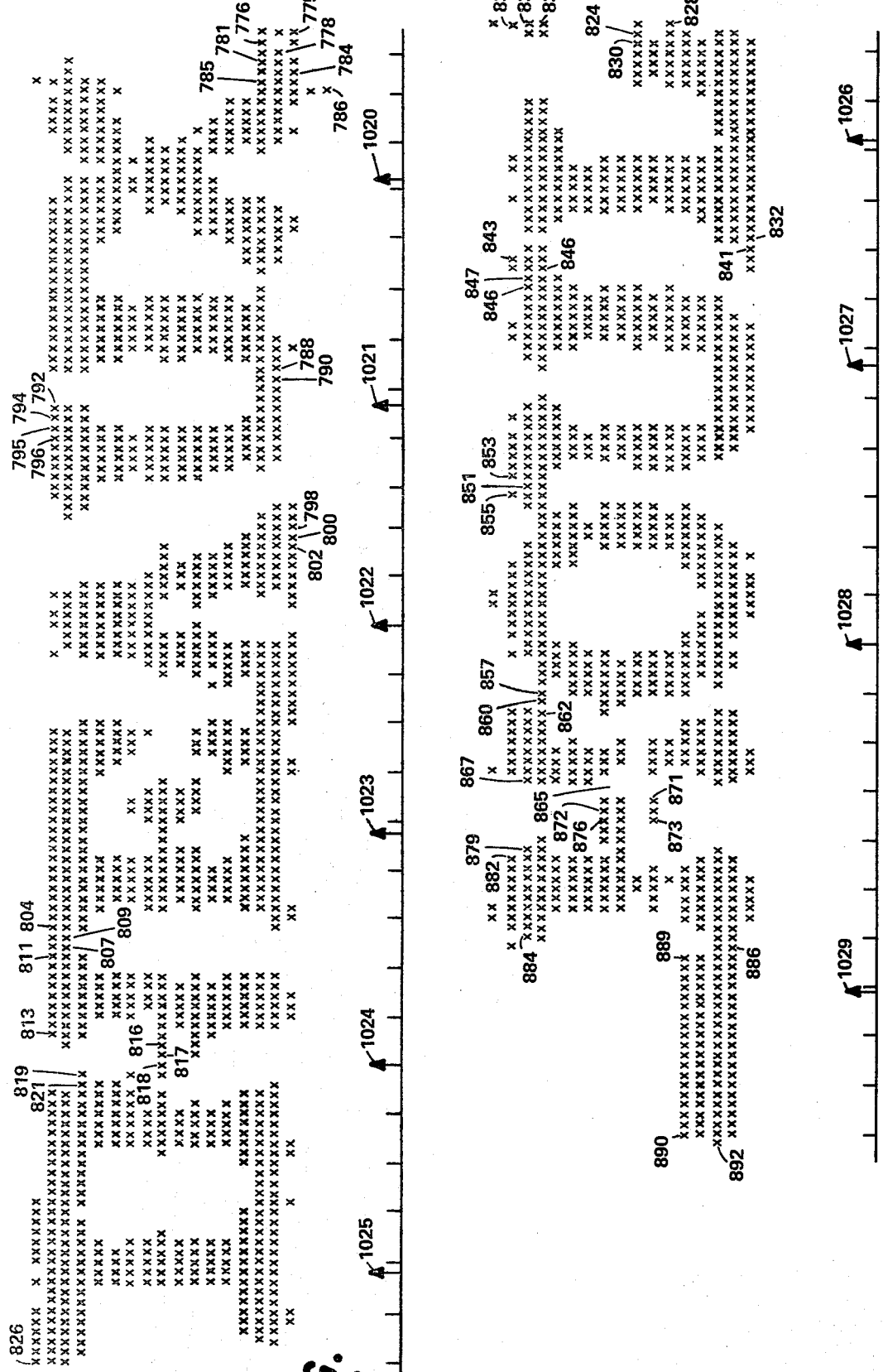
Figure 22:
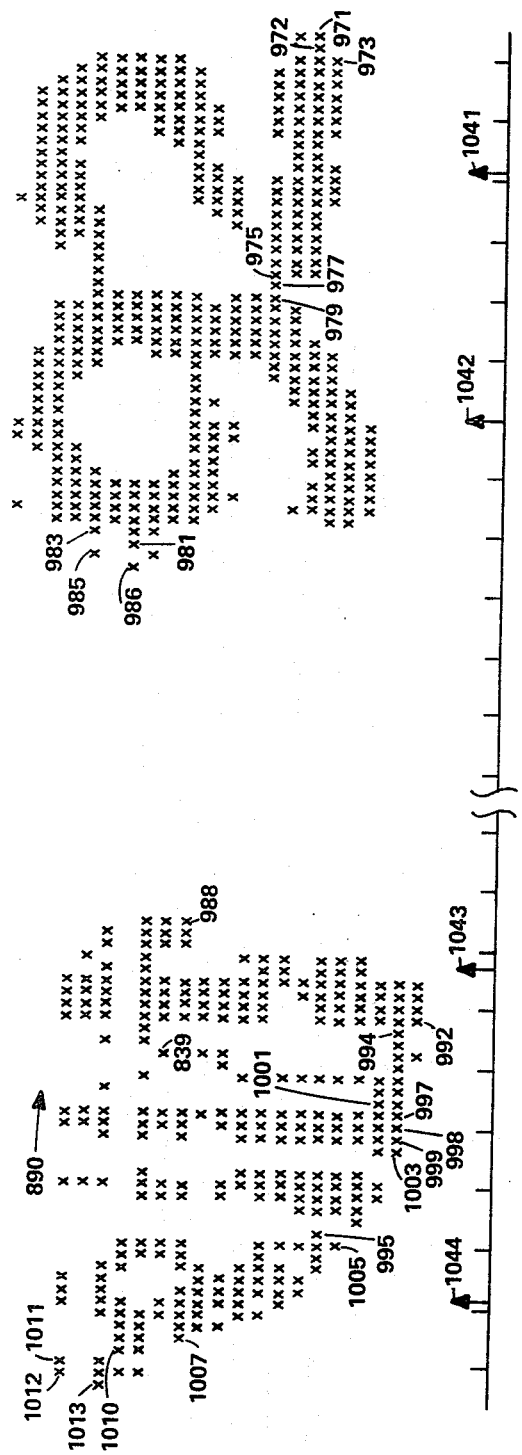

A one scan width space (S$_2$) is assumed and thus the next character segment (C$_3$) begins with scan 802. The next qualified scan of a character segment which meets the criterion of scan detector 114 is as discussed above scan 802. All the scans between scan 802 and scan 804 form the third character segment (C$_3$) of table V herebelow. Scans 807 and 809 form a space (S$_3$) between character segment (C$_3$) and character segment (C$_4$) which beings with scan 811 (which qualifies under the criterion utilized by scan detector 114). Segment (C$_4$) extends between scans 811 and 813. The four scans 816 through 819 do not qualify and comprise the space (S$_4$). Scan 821 which follows and is adjacent to scan 819 does qualify and meets the criterion of scan detector 114. Scan 821 is the first scan of character segment (C$_5$). Character segment (C$_5$) extends between and is inclusive of scans 821 through 824 (FIG. 19). The leftmost scan 826 of FIG. 18 is adjacent to the rightmost scan 828 of FIG. 19 in the data stream. In other words, scan detector 114 receives scan 826 followed by the receipt of scan 828. As can be seen from the video, the scan 830 following scan 824 does not have a data bit occupying a certain position within the scan which contains character information for the three and that certain position has contained character information during the prior three consecutive scans. This determination being made by the sneak through detector 106 is discussed above.

Scan 824 is designated as a space (S$_5$) in scan 830 is the first scan of character segment (C$_6$). Segment (C$_6$) extends from scan 830 through scan 832. All the intervening scans qualify under the three of five or two adjacent scans containing character information occurs at least twice during the scan criteria utilized by scan detector 114. In an example, referring back to scan 828, the scan qualifies under the three of five criterion utilized by scan detector 114 because three adjacent data bits 835 through 837 contain character information. Any three data bits containing character information of any five adjacent data bits would be sufficient; thus the data bits need not be adjacent and could be separated by one or two data bit which does not contain character information. For example, scan 839 of FIG. 22 would meet the criterion utilized by scan detector 114 because it has three data bits containing character information of five adjacent data bits.

As shown in FIG. 19 scan 832 is the last scan of character segment (C$_6$). Since scan 841, which is the next scan received by scan detector 114, does not meet the criterion of scan detector 114 this fact is so indicated to segment generator 112 which stores the fact that character segment (C$_6$) is 20 scans wide into memory 135. The next scan 843 received by scan detector 114 does meet the criterion of scan detector 114 and the next three scans 846 through 849 also qualify because they meet the criterion utilized by scan detector 114. Therefore segment generator 124 declares that a valid character segment ($C_7$) has begun and that space ($S_6$) has a width of one scan. From scan 843 all the scans between meet the criterion of scan detector 114 until scan 851 is received by scan detector 114. Scan detector 114 so indicates to segment generator 124. Segment generator 124 declares that segment ($C_7$) had a width of 23 scans and stores this segment into memory 135 as discussed above. Thus, segment ($C_7$) extends from scan 846 to scan 853, which is adjacent to scan 851 within the data stream and is received by scan detector 114 just prior to the receipt of scan 851. The other scan 855 adjacent to scan 851 meets the criterion of scan detector 114 and so do the scans between scan 855 and scan 857. Scan 857 is the last scan of character segment ($C_8$) which has a width of 21 scans because the next scan 860 received by scan detector 114 does not meet the critrion of scan detector 114. Scan detector 114 so indicates to segment generator 124 and segment generator 124 stores character segment ($C_8$) into memory 135. The next scan 862 received by scan detector 114 after scan 860 does meet the criterion of scan detector 114 as do the scans received by scan detector 114 until scan 865 is received. Segment generator stores space ($S_6$) as having a one scan width. Scan 865 has no data bits which contain character information and this fact is so indicated by detector 101 segment generator 114. Thus, scan 867 is the last scan of character segment ($C_9$) which extends from scan 862 to scan 867.

Although the next three scans 871 through 873 meet the criterion of scan detector 114 as character scans, the fourth scan 876 does not and therefore, all of the scans 865, 871 through 873, and scan 876 are considered to be part of a space ($S_9$) which extends from scan 865 to scan 879. The next scan 882 received by scan detector 114 does meet the criterion of scan detector 114 and so do the next three scans. Therefore, space ($S_9$) is seven scans in width from scan 867 to scan 879 with one scan without any data bits containing character information.

Character segment ($C_{10}$) begins at scan 882 and extends to scan 884. Scan 884 meets the criterion of scan detector 114 because it has two pairs of adjacent data bits containing character information. The next scan 886 received by scan detector 114 does not meet the criterion of scan detector 114 and therefore does not qualify as a character scan and scan detector 114 signals to segment generator 124 that this is a space scan. Thereupon segment generator 124 stores character segment ($C_{10}$) as a character segment having a width of 9 scans into memory 135. All the scans from scan 889 to 890 meet the criterion of scan detector 114 and form character segment ($C_{11}$) having a width of 19 scans. Prior to determining the width of character segment ($C_{11}$), segment generator 124 determines that space ($S_{10}$) has a width of one scan (which is scan 886). Character segment ($C_{11}$) is 19 scans in width and ends with scan 890.

The leftmost scan 892 of FIG. 19 which contains character information is separated from the rightmost scan 894 containing character information in FIG. 20 by two scans which do not contain any data bits containing character information. The presence of these scans would be noted and so indicated to segment generator 124 by detector 101. The scan 897 following scan 894 does meet the criterion of scan detector 114 and is the first scan of character segment ($C_{12}$) which extedns some 49 scans from scan 897 to scan 899. Character segment ($C_{12}$) ends because the scan 901 following scan 899 does not meet the criterion of scan detector 114. The next scan 903 which is adjacent to scan 901 is the first scan of character segment ($C_{13}$). Character segment ($C_{13}$) has a width of 15 scans and ends with scan 905 which is followed by scan 907.

Scan 907 does not meet the criterion of scan detector 114 and therefore is not qualified as a character scan and thus is determined to be a space scan. The next scan 909 which is adjacent to scan 907 is the first scan of character segment ($C_{14}$). Scans 903 and 907 comprise spaces ($S_{12}$ and $S_{13}$), respectively. Character segment ($C_{14}$) has a width of 21 scans and extends from scan 909 to scan 911. Scan 911 is followed by scans 913 and 914 which do not meet the criterion of scan detector 114 and, therefore, are determined by scan detector 114 to be space scans. Scan 914 is followed by scan 916 which is the first scan of character segment ($C_{15}$). Scans 913 and 914 thus comprise a space ($S_{14}$). All the scans between scan 916 and 918 meet the criterion of scan detector 114 and along with scans 916 and 918 comprise character segment ($C_{15}$). Character segment ($C_{15}$) ends because scan 920 does not meet the criterion of scan detector 114. Scan detector 114 would indicate that this is a space scan to segment generator 124 and segment generator 124 would store character segment ($C_{15}$) as having a width of 21 scans into memory 135. Scan 922 which is adjacent to scan 920 also does not meet the criterion and together with scan 920 comprises space ($S_{15}$).

Scan 924, which is the first scan of character segment ($C_{16}$) does meet the criterion of scan detector 114 and, therefore, is noted as a character scan to segment generator 124, although as discussed above segment generator 124 does not qualify a character segment until four consecutive scans have qualified as character scans which meet the criterion of scan detector 114. All the scans subsequent to scan 924 meet the criterion of scan detector 114 until scan 926 is received. Scan 926 does not meet the criterion of scan detector 926. Thus, character segment ($C_{16}$) is a width of 22 scans beginning with scan 924 and ending with scan 928. Scan 926, which is the leftmost scan of FIG. 20 is separated within the data stream from scan 930, which is the rightmost scan of FIG. 21, by one scan which does not contain character information. This scan which does not contain character information would be noted by detector 101 which would signal segment generator 124 of that occurrence. The scan between scans 926 and 930, and scans 926 and 930 comprise space ($S_{16}$) which of course has a width of three scans. Scan 932 meets the criterion of scan detector 932 as do all the scans between scan 932 and scan 934. It should be noted that scan 934 and scans 936 and 938 meet the criterion of scan detector 114 because each of these scans has two pairs of adjacent data bits. Character segment ($C_{17}$) has a width of 40 scans beginning with scan 932 and ending with scan 934.

The two scans 942 and 943 do not meet the criterion of scan detector 114 and therefore comprise a portion of the scans of a space ($S_{17}$). Scan 943 is separated from scan 945 by 30 scans which do not contain any character information. All of the 30 scans, which do not contain character information between scans 943 and 945, would be detected by detector 101 and their presence would be indicated to segment generator 124. Thus, space ($S_{17}$) has a width of 34 scans. The next scan 947 which is adjacent to scan 945 meets the criterion of scan detector 114 and is the first scan of character segment ($C_{18}$). Character segment ($C_{18}$) has a width of ten scans and extends from scan 947 to scan 950. Scan 950 is followed by scans 952 and 953. Neither scan 952 or 953 meet the criterion of scan detector 114. Scan 953 is separated from the next scan 955 containing character information by two scans without any character information. The occurrence of these two scans would, of course as discussed above, be noted by detector 101 and their occurrence indicated to segment generator 124. Segment generator 124 would store that information into memory 135 for use by processor 88 as discussed above. The two scans which do not contain character information, and scans 952 and 953 comprise a space ($S_{18}$) which has a width of four scans. Scan 955, which is the first scan of character segment ($C_{19}$), does meet the criterion of scan detector 114. All the scans subsequent to scan 955 within the data stream meet the criterion of scan detector 114 until scan 957 is received. Thus, scan 959 is the last scan of character segment ($C_{19}$) which has the width of 22 scans. Character segment ($C_{19}$) extends from scan 955 to scan 959.

Scan 957 is separated from the next scan 962 containing character information by eight scans which do not contain character information. These scans are of course detected by detector 101. All the scans between scan 962 and scan 964 meet the criterion of scan detector 114 and those scans including scans 962 and 964, comprise character segment ($C_{20}$). Character segment ($C_{20}$) has a width of nine scans. The space ($S_{19}$) between character segment ($C_{19}$) and character segment ($C_{20}$) has a width of nine scans which includes scan 957. The next three scans 966 through 968 of FIG. 21 do not meet the criterion of scan detector 114. Scan 968, which is the leftmost scan of FIG. 21, is separated from the rightmost scan 971 of FIG. 22 by two scans which do not contain character information. Scan 972 does not meet the criterion of detector 114. The next scan 973 received by scan detector 114 does meet the criterion of scan detector 114 as do more than four subsequent scans. Thus, scan 973 is the first scan of character segments ($C_{21}$). Space ($S_{20}$) has a width of seven scans including scans 966 through 968, scans 971 and 972 and the two scans between scans 971 and 968 which do not contain any character information.

All of the scans between scan 973 and 975 meet the criterion of scan detector 114 and comprise a character segment ($C_{21}$) which has a width of 19 scans. The next scan 977 following scan 975 does not meet the criterion of scan detector 114. The other scan 979 which is adjacent to scan 977 is the first scan of character segment ($C_{22}$). Thus, scan 977 located between character segment ($C_{21}$) and ($C_{22}$) comprises the space ($S_{21}$). All the scans subsequent to scan 979 meet the criterion of scan detector 114 until scan 981 is received by scan detector 114 from vertical analyzer 64. Thus, character segment ($C_{22}$) has a width of 21 scans extending from scan 979 to scan 983. Subsequent to scan 981 two additional scans 985 and 986 which contain character information are also received by scan detector 114 and do not meet the criterion thereof. The next scan 988 which contains character information subsequent to scan 986 is separated from scan 986 by 64 scans which do not contain any character information. The group of scans containing character information (generally designated 890) is a smudge or mar upon the written medium 32 (FIG. 1) but, of course, it is converted into scans which contain data bits characterizing either background or character information.

The scans between scan 988 and 992 the criterion of scan detector 114 comprise a character segment ($C_{23}$) which has a width of 9 scans. The space ($S_{22}$) between character segment ($C_{22}$) and ($C_{23}$) is comprised of the 64 scans which do not contain any character information and scans 981, 985 and 986. Thus, space ($S_{22}$) has a width of 67 scans. The next scan 994 following scan 992, within the data stream, does not meet the criterion of scan detector 114 and is one of the scans comprising space ($S_{23}$). Space ($S_{23}$) extends from scan 994 to scan 995. This forms a space ($S_{23}$) which has a width of 18 scans. It should be noted that although, for example, scans 997 through 999 do meet the criterion of scan detector 114 as character scans, they are preceded by and followed by scans 1001 and 1003 which do not meet the criterion of scan detector 114. As discussed above, it is necessary that four consecutive scans meet the criterion of scan detector 114 in order for the segment generator 124 to declare a valid character segment. Thus, space ($S_{23}$) has a width of 18 scans extending from scan 994 through scan 995. The final character segment ($C_{24}$) has a width of 9 scans extending from scan 1005 which is both adjacent and subsequent to scan 995 to scan 1007 which is the last scan of character segment ($C_{24}$). Scans 1010 through 1013 contain character information but only scan 1012 meets the criterion of scan detector 114 and a single character scan does not qualify as a valid character segment as determined by segment generator 124. The scans subsequent to scan 1013 do not contain character information.

This line of video from vertical analyzer 64 comprises 825 scans. The average number of data bits per scan is equal to six. Therefore, the three of five ratio which was discussed above in detail is utilized. The character segments are set forth in Table V below along with the results of the recycle operation and the combined character operation. Arithmetic unit 152 (FIG. 2) calculates a recycle number of 37 based on the character segments set forth below in Table V. The first set of combined character segments are then stored into temporary storage units 160 and 161 and are utilized by the arithmetic unit 152 to calculate a new recycle number which is equal to 40. The new recycle number is then applied by processor 88 to the character segments stored in memory 135. Only those character segments which can be combined together under the recycle number 40 are discussed in detail here below. That is, only the second interation of the recycle operation is discussed here below.

TABLE V

| Character Segments (C) | | Spaces (S) | | Combined Character Segments (CC) | | Spaces (CS) | | Combined Recovery Character Segments (CRC) | | Spaces (CRS) | |
| --- | --- | --- | --- | --- | --- | --- | --- | --- | --- | --- | --- |
| C1 | 32 | $S_1$ | 3 | $CC_1$ | 32 | $CS_1$ | 3 | $CRC_1$ | 23 | $CRS_1$ | 1 |
| C2 | 12 | $S_2$ | 1 | $CC_2$ | 12 | $CS_2$ | 1 | $CRC_2$ | 23 | $CRS_2$ | 1 |

TABLE V-continued

| Character Segments (C) | | Spaces (S) | | Combined Character Segments (CC) | | Spaces (CS) | | Combined Recovery Character Segments (CRC) | | Spaces (CRS) | |
|---|---|---|---|---|---|---|---|---|---|---|---|
| $C_3$ | 41 | $S_3$ | 2 | $CC_3$ | 41 | $CS_3$ | 2 | $CRC_3$ | 20 | $CRS_3$ | 1 |
| $C_4$ | 9 | $S_4$ | 4 | $CC_4$ | 9 | $CS_4$ | 9 | $CRC_4$ | 4 | $CRS_4$ | 2 |
| $C_5$ | 31 | $S_5$ | 1 | $CC_5$ | 31 | $CS_5$ | 4 | $CRC_5$ | 20 | $CRS_5$ | 0 |
| $C_6$ | 20 | $S_6$ | 1 | $CC_6$ | 20 | $CS_6$ | 1 | $CRC_6$ | 22 | $CRS_6$ | 1 |
| $C_7$ | 23 | $S_7$ | 1 | $CC_7$ | 23 | $CS_7$ | 1 | $CRC_7$ | 20 | $CRS_7$ | 1 |
| $C_8$ | 21 | $S_8$ | 1 | $CC_8$ | 30 | $CS_8$ | 7 | $CRC_8$ | 23 | $CRS_8$ | 7 |
| $C_9$ | 8 | $S_9$ | 7 | $CC_9$ | 29 | $CS_9$ | 4 | $CRC_9$ | 30 | $CRS_9$ | 7 |
| $C_{10}$ | 9 | $S_{10}$ | 1 | $CC_{10}$ | 49 | $CS_{10}$ | 1 | $CRC_{10}$ | 29 | $CRS_{10}$ | 4 |
| $C_{11}$ | 19 | $S_{11}$ | 4 | $CC_{11}$ | 37 | $CS_{11}$ | 2 | $CRC_{11}$ | 24 | $CRS_{11}$ | 1 |
| $C_{12}$ | 49 | $S_{12}$ | 1 | $CC_{12}$ | 21 | $CS_{12}$ | 2 | $CRC_{12}$ | 24 | $CRS_{12}$ | 1 |
| $C_{13}$ | 15 | $S_{13}$ | 1 | $CC_{13}$ | 22 | $CS_{13}$ | 3 | $CRC_{13}$ | 18 | $CRS_{13}$ | 1 |
| $C_{14}$ | 21 | $S_{14}$ | 2 | $CC_{14}$ | 40 | $CS_{14}$ | 34 | $CRC_{14}$ | 18 | $CRS_{14}$ | 2 |
| $C_{15}$ | 21 | $S_{15}$ | 2 | $CC_{15}$ | 10 | $CS_{15}$ | 4 | $CRC_{15}$ | 21 | $CRS_{15}$ | 2 |
| $C_{16}$ | 22 | $S_{16}$ | 3 | $CC_{16}$ | 22 | $CS_{16}$ | 9 | $CRC_{16}$ | 22 | $CRS_{16}$ | 3 |
| $C_{17}$ | 40 | $S_{17}$ | 34 | $CC_{17}$ | 9 | $CS_{17}$ | 7 | $CRC_{17}$ | 20 | $CRS_{17}$ | 0 |
| $C_{18}$ | 10 | $S_{18}$ | 4 | $CC_{18}$ | 19 | $CS_{18}$ | 1 | $CRC_{18}$ | 20 | $CRS_{18}$ | 34 |
| $C_{19}$ | 22 | $S_{19}$ | 9 | $CC_{19}$ | 21 | $CS_{19}$ | 67 | $CRC_{19}$ | 10 | $CRS_{19}$ | 4 |
| $C_{20}$ | 9 | $S_{20}$ | 7 | $CC_{20}$ | 9 | $CS_{20}$ | 18 | $CRC_{20}$ | 22 | $CRS_{20}$ | 9 |
| $C_{21}$ | 19 | $S_{21}$ | 1 | $CC_{21}$ | 9 | $CS_{21}$ | 140 | $CRC_{21}$ | 9 | $CRS_{21}$ | 7 |
| $C_{22}$ | 21 | $S_{22}$ | 67 | | | | | $CRC_{22}$ | 19 | $CRS_{22}$ | 1 |
| $C_{23}$ | 9 | $S_{23}$ | 18 | | | | | $CRC_{23}$ | 21 | $CRS_{23}$ | 67 |
| $C_{24}$ | 9 | $S_{24}$ | 40 | | | | | $CRC_{24}$ | 9 | $CRS_{24}$ | 140 |

Character segments ($C_8$ and $C_9$) which have widths of 21 and 8 scans, respectively, and a one scan space ($S_8$) there between are combined together to form a combined character segment ($CC_8$) which is a width of 30 scans. Space ($S_9$) becomes space ($CS_8$). Character segment ($CC_{10}$) and ($CC_{11}$) and ($S_{10}$) are combined to form a combined character segment ($CC_9$) which has a width of 29 scans. Character segment ($C_{12}$) becomes combined character segment ($CC_{10}$) in the series of combined character segments. Character segments ($C_{13}$) and ($C_{14}$) and space ($S_{13}$) are combined to form a combined character segment ($CC_{11}$) which has a width of 37 scans. It should be remembered that the inhibit rules discussed above prevent the combining of certain character segments together. For example, character segments ($C_{19}$) and ($C_{20}$) have widths of 22 and 9 scans, respectively and a 9 width space ($S_{19}$) there between. The width of a character formed by combining these two character segments and a space there between is equal to 40 which does not exceed the recycle number (RC); therefore, ordinarily these two character segments would be combined. However, since the average number of data bits per scan containing character information is equal to six, one scan which does not contain character information disposed between the two character segments which is desired to be combined inhibits the combination (as set forth in Table I above). Referring now to FIG. 21, it is seen that there is more than one scan which does not contain character information disposed between the two character segments ($C_{19}$ and $C_{20}$) and is shown in FIG. 21 between the last scan 959 of character segment ($C_{19}$) and the first scan 962 of character segment ($C_{20}$). If a new recycle number is calculated from the combined character segments (CC) shown in Table V, the recycle calculated is equal to 40. Thus, since the recycle number has not changed, the processor 88 (FIG. 2) enters into the combined character recovery operation.

In the combined character recovery operation the processor 88 calculates the suspect character width and the minimum and maximum natural break values. The particular suspect character width (SCW) calculated from the results of the recycle scan as shown in Table V above is equal to 26. The natural break minimum value is equal to 32 and the natural break maximum value is equal to 49. As discussed above the processor 88 determines if any of the combined character segments are greater than the suspect character width 26. For example, the first combined character segment ($CC_1$) has a width of 32 which is equal to or greater than the suspect character width number of 26. Since this is the first combined character segment, the processor 88 cannot look backward, i.e. combine the combined character segment which is greater than or equal to the suspect character width with the prior combined character segment in the series. When combined character segments ($CC_1$) and ($CC_2$), and the space there between, ($CS_1$) are added together, the sum is equal to 47 scans. The sum, 47, is within the range between the maximum and minimum natural break of 32 through 49. Thus these two character segments are broken into two combined recovery segments ($CRC_1$ and $CRC_2$) characters of equal width. Since the sum of the two combined character segments ($CC_1$) and ($CC_2$) and the space ($CS_1$) is an odd number, a space ($CRS_1$) of one scan is provided between segments ($CRC_1$ and $CRC_2$). The combined character segment ($CC_3$) is next to examine and determine to be equal to or exceed the suspect character width of 26. However, combined character segment ($CC_3$) cannot be combined with ($CC_4$) within the natural break range. The sum of combined character segment ($CC_3$) and ($CC_4$) and space ($CS_3$) is equal to 52 which is outside the inclusive natural break range of 32 through 49. Combined character segment ($CC_4$) is less than SCW. The combined character segment ($CC_5$), which exceeds the SCW, can be combined with combined character ($CC_4$) and space ($CS_4$) which is utilized to form two character segments ($CRC_5$) and $CRC_6$) which have a width of 22 scans and a space ($CRS_5$) between of zero scans because the sum is an even number. It should noted that the inhibit rules as discussed above also apply to the procedure set forth above. Thus, if the space ($CS_4$) had contained one or more scans without character information, the combined character segment ($CC_4$) and ($CC_5$) could not have been combined and then adjusted to form the character segments (CRC$_5$) and (CRC$_6$). These are the only combined character segments which are adjusted.

Next the processor 88 examines each of the combined character segments to determine if any are greater than the natural break minimum of 32. (CC$_3$), (CC$_{10}$), (CC$_{11}$), and (CC$_{14}$) exceed the natural break minimum (NBMIN) of 32. These character segments are broken into two character segments of equal width with one space there between if the combined character segment has an odd width. For example, combined character segment (CC$_{10}$) is broken into combined recovery segments (CRS$_{11}$) and (CRS$_{12}$) which have widths of 24 scans and a one scan space (CRS$_{11}$) there between. In another example, (CC$_{14}$) which has a width of 40 scans is divided into two combined recovery segments (CRS$_{17}$) and (CRS$_{18}$) which both have widths of 20 scans with a space (CRS$_{17}$) of zero scans disposed there between. The results of the system for character presence detection 70 (FIG. 2) is provided as an output of memory control unit 184 through channel 77 to character recognition unit 75 as discussed above.

The video contained in FIGS. 18 through 22 although degraded is in reality an address which is "92131 ISSY LES HOULINEAUX". If the combined character recovery results shown in the table above are compared with the video in FIGS. 18 through 22, it becomes rapidly apparent that each of the characters with two exceptions has in fact been located. This is true even though many of the characters are overlapping and the video is degraded. For example, as shown in FIG. 21, the character segment (C$_{17}$) which extends from scan 932 to scan 934 has been divided into two fine recovery segments (CRS$_{17}$) and (CRS$_{18}$) each of which have a width of 20 scans. Thus, these touching characters which are "S" and "I" have been located even though they are touching and overlap to some extent.

The centers of all of the combined recovery character (CRC$_1$) through (CRC$_{25}$) are indicated by arrows 1020 through 1044. For example, the center of character segment (CRC$_{21}$) has its center designated by arrow 1040. As can be seen by examining the various centers, all the characters have been located with the exception of combined character recovery character segment (CRC$_{10}$) which is comprised of a dash and a portion of an H. Also, the other part of the H and a portion of an O have been combined together to form combined character recover character segment (CRC$_{11}$). The remainder of the characters have been located in the data stream by the processor 88 (FIG. 2) despite the fact that many of the character segments are touching, overlapping, and in some cases are smudged.

In operation, the system for character presence detection 70 (FIG. 2) receives the output from a vertical analyzer 64. The output of vertical analyzer 64 is stored into a line memory 68. The function of the vertical analyzer is to provide the video which is representative of a line of characters on the written medium 32 (FIG. 1). The units of the system for character presence detection which receive the output of character analyzer 64 are counters 82 and 90, end of line and reset unit 95, and detectors 101, 106, 112 and 114. The output of the vertical analyzer 64 is used by counter 82 to compile a count of the total number of data bits in the data string from vertical analyzer 64, which contain character information. Counter 90 provides as an output a total of the number of scans received by system 70 from vertical analyzer 64. The counts provided by counters 82 and 90 are utilized by processor 88 to calculate the average number of data bits containing character information per scan. Unit 95 indicates to processor 88 when the end of line signal is received from vertical analyzer 64 indicating that all of the scans of that particular line of video have been presented to system 70.

Detectors 101 and 106 receive the output of vertical analyzer 64 and utilize that output to locate scans which do not contain character information in the case of detector 101, and to signal when none of the unique positions occupied by data bits within the scans have contained character information for four consecutive scans. When the segment generators 122 and 124 receive the output of detector 101, those scans without character information are noted and located as a portion of the information concerning the space between character segments of which they are a part. Segment generators 122 through 124 end character character segments when the detector 106 determines that none of the unique positions of data bits within the scans contain character information for four consecutive scans including the present scan. Scan detectors 112 and 114 utilize certain predetermined, although different, criterion to determine whether a scan is a character scan or a space scan. Four consecutive character scan indications from a scan detector are necessary before its associated segment generator declares a valid character segment. The scan detectors can utilize any desirable criteria but those utilized herein have been found to be particularly useful in the equipment described herein.

Detector 112 utilizes a criterion in which two of any six adjacent (i.e., consecutive) data bits must contain character information for that scan to be determined to be a character scan. Scan detector 114 utilizes two criterion. The scan is determined to be a character scan if either or both of the criterion are met. One criterion is that if any three of five adjacent (i.e., consecutive) data bits contain character information, that scan is a character scan. The other criterion utilized by scan detector 114 is that a scan is a character scan if it contains at least 2 pairs of adjacent data bits.

The output of the scan detector is utilized by the associated segment generators to compile character segments. The character segments begin when four consecutive scans have met the criterion of the scan detector connected to that particular segment generator. The character segment ends when a scan is found not to be a character scan or detector 106 determines that none of the data bit positions within the scans have character information for the three prior scans and the scan currently being received from vertical analyzer 64. When the segment generator concludes that the character segment has ended, the character segment is stored into the memory associated with the segment generator. The character segments are also stored into a temporary storage unit. The temporary storage units are connected to an arithmetic unit 152. The memories are connected to a processor 88. The segment generators also store the number of scans in each space in serial order into the memories along with the number of scans indicated by detector 101 as not containing character information within each space.

The arithmetic unit 152 utilizes the output of either segment generator 122 stored into temporary storage unit number 146 or the output of segment generator 124 stored into temporary storage unit 148 as determined by the average number of data bits containing character information per scan calculated by processor 88. The arithmetic unit 152 calculates a recycle number (RC) which is communicated to processor 88. The recycle number is utilized by processor 88 to combine certain character segments together if the character segments and the spaces there between do not exceed the recycle number. This combination is subject to certain inhibit rules which specify the number of scans which do not contain character information within a space to prevent the combining of the adjacent character segments. Processor 88 stores the combined character segments and those not combined into storage units 173, 160 and 161. Arithmetic unit 152 addresses the information in temporary units 160 and 161 to calculate a new recycle number which is transferred to processor 88.

Processor 88 compares the new calculated recycle number with the prior recycle number and halts the operation if the recycle number has not changed. If the recycle number has changed, then processor 88 utilizes the newly calculated recycle number to combine the character segments stored in either memory 130 or 135 as selected by the criterion of the number of data bits per scan containing character information. Processor 88 again attempts to combine the character segments stored in the selected memory such that the character segments and the space there between do not exceed the recycle number. When this operation is complete, the arithmetic unit again calculates the recycle number based on the newly generated combined character segments and the operation continues until the recycle number newly calculated has not changed from the prior recycle number, i.e., is equal to or approximately equal to the prior recycle number. When this occurs, processor 88 then calculates a suspect character width value (SCW) and maximum (NBMAX) and minimum (NBMIN) break values as discussed above. These numbers are stored into temporary storage unit 174 (or they could be stored in special storage locations within processor 88).

The combined character segments stored in memory 173 are utilized by processor 88 in the combined character recovery operation. Each of the combined character segments stored in memory 173 is compared to the suspect character width value to determine if any of the combined character segments are greater than or equal to the suspect character width (SCW). If any are greater than the suspect character width, then that particular combined character segment is summed with the prior combined character segment and space there between to determine if the sum is in the range of natural break miinimum to natural break maximum values. It should be noted that the inhibit rules stored within processor 88 relating to the number of scans which do not contain any character information within a space set forth in Table I above apply to the combination of combined character segments in the combined recovery operation.

If the sum of the two combined character segments and the space there between is within the inclusive natural break range, then the character segments are adjusted so that there are two characters of equal width allowing a space of one scan if the combined width is an odd number. If the sum of the combined character segment which is greater than or equal to the suspect character width and the prior scan and the space there between is not within the inclusive range of natural break minimums and natural break maximums (or the inhibit rules apply), then the combined character segment which is greater than the suspect character width is summed with the subsequent combined character segment and the space there between. This sum is compared to the natural break maximum to determine if it was within the inclusive range there between. If the combined character segments can be combined within the inclusive natural break range (assuming that the inhibit rules do not prohibit the combination) then the character segments are adjusted as if each character has the same width allowing a space of one scan if the combined width is an odd number.

After the processor 88 has compared all of the combined character segments stored in memory 73 with the suspect character width in the operation described hereabove, each combined segment is compared to the natural break minimum to determine if any combined character segment is greater than the natural break minimum. If any of the characters are greater than the natural break minimum, then the combined character segment is broken into two characters of equal width. The results of these operations are stored into memory 173 to form a series of combined recovery character segments with spaces disposed there between. The stored series is addressable in the sequence in which the video was originally received from vertical analyzer 64. In other words, the combined character recovery character segments (CRC) and space (CRS) are stored into memory 173, which can be a compartmentalized memory such that the combined character segments are stored in some locations and the combined character recovery character segments are stored in other separate locations or perhaps a dual memory is utilized wherein memory 173 is in actuality 2 completely separate memories. The segments (CRC) and spaces (CRS) are stored in such a series that the first combined character recovery character segment equates to the first video which qualifies as a character segment from vertical analyzer 64. The next recovery character segment is formed by video which is received subsequently to the video which made up the first combined recovery character segment.

Processor 88 then performs the delimiter operation. The spaces, which are now the combined recovery character spaces (CRS) stored in temporary storage unit 173 are utilized by processor 88 to determine which of the spaces are voids between words rather than gaps between characters within the same word. In order to do this a delimiter value (D) is calculated by processor 88 and any of the spaces greater than the delimiter value are declared by processor 88 to be voids between words rather than gaps between characters within the same word. The space which is a void between words is flagged within memory 173 by processor 88. Processor 88 then notifies memory control unit 184 that its operation on this line of video is complete. Memory control unit 184 causes line memory 86 to transfer its video to character recognition unit 75 (FIG. 1). Also, the memory control unit 184 transfers the contents of memory 173 through channel 77 to character recognition unit 75.

In summary, the system and method for character presence detection, as shown herein, acts upon video which represents a line of characters. Each scan is determined to meet or not meet certain criteria based on the distribution of data bits containing character information within each scan. A certain number of consecutive scans which meet one of the different criteria are necessary to declare a valid character segment. The number of consecutive scans as shown herein is 4 although this number can be more or less depending on the particular medium and design requirements which the system must meet. One or more series of character segments, each scan of which meets a criterion, are formed from the video. The sets of character segments will be different because the criterion utilized to determine whether or not a particular scan is a character scan is unique.

The average number of data bits which contain character information first scan is calculated over the entire line and the location of any scans which do not contain any character information are noted and identified with a particular space. A character segment ends if a scan does not qualify it as a character scan under the particular criterion being utilized or the occurrence of a certain event, which is that none of the unique data bit positions within the scans has contained character information for four consecutive scans including the current scan being received. Thus, the line of video which is divided into scans comprising a binary data stream containing character bits which represent either background information or character information is fragmented and encoded into character segments and spaces there between. As discussed above, the number and occurrence of scans which do not contain any character information are noted for each space. The particular series of character segments and spaces utilized to detect the location and presence of characters is determined by the average number of data bits per scan calculated as discussed above. Thus, the character segments developed by a particular criterion or one or more criteria is utilized depending on the average number of data bits containing character information per scan. Once this particular series of character segments and spaces is determined, only those character segments are used in the following operation. A recycle number (RC) is calculated by utilizing the following equation: $RC = (10-BAV) + ACW + SC$, where BAV is the average number of data bits containing character information per scan and ACW and SD are the average width of the character segments and the standard deviation of character segments, respectively, excluding character segments less than 8 scans wide. Beginning with the first character segment generated, that character segment and the adjacent character segment and a space there between are summed and that sum is compared with the recycle number calculated. If the sum does not exceed the recycle number, then the next character segment in the series and space there between are combined with the prior sum, and this new sum compared to the recycle number. This continues until the sum exceeds the cycle number. If the addition of another character segment and the space there between causes the sum to exceed the recycle number then that character segment and the space there between are not combined to form the combined character segment. In other words, segments and the spaces there between are combined together until the addition of the next character segment and the space there between would exceed the cycle number. Thus, the spaces and character segments which can be combined without exceeding the recycle number are formed into a single combined character segment. This operation then goes on until the character segment whose addition with the space there between would have exceeded the recycle number. Then, that character segment is then combined with the next character segment in the series and the space there between and the operation continues as discussed above.

Table I set forth here above provides the number of scans without character information necessary within a space to inhibit the combination of the adjacent character segments together to form a combined character segment. This is variable depending on the average number of data bits containing character information per scan. Having formed the combined character segments (CC) with the spaces there between (CS), a new recycle number (RC) is calculated based on those combined character segments. The new recycle number is then utilized to form a new set of combined character segments from the original character segments as discussed above, and this operation continues until the newly calculated recycle number is equal to the prior recycle number. When this occurs the recycle operation is complete and the combined character recovery operation begins. First a suspect character width (SCW) utilizing the following formula is calculated: $SCW = ACS + ACS/SD$, where ACS is the average width of the combined character segments and SD is the standard deviation excluding segments less than 8. The standard deviation and average character width from the last interation of the recycle operation is utilized to calculate the suspect character width (SCW). A maximum (NBMAX) and minimum (NBMIN) are calculated utilizing the following formuli: $NBMIN = 2 \times ACS - SD - P$, and $NBMAX = 2 \times ACS + S - P$ where ACS is the average width of combined character segments and SD is the standard deviation thereof excluding combined character segments less than 8 and where P is the number of combined character segments greater than $ACS + SD$.

The suspect character width value is utilized to compare each of the combined character segments to determine if any of the character segments are greater than or equal to the suspect character width. If any are greater than or equal to the suspect character width, then the prior combined character segment and the space there between and the character segment which has been found to be greater than or equal to the suspect character width are combined to form a sum. The inhibit rules of Table I also apply to this operation. This sum is compared to the natural maximum and minimum break values to determine if the sum falls within the inclusive range. If the sum is not within the inclusive range, then the combined character segment which is greater than or equal to the suspect character width and the subsequent combined character segment in the series thereof and the space there between are summed and that sum is compared with the inclusive range of natural break minimum and maximum to determine if the sum is therein. If the two combined character segments can be combined in the natural break range, then the character segments for these two are adjusted as if each character has the same width allowing a space of one scan at the combined width as an odd number and a space of zero scans if the combined width is an even number.

After all the combined character segments have been so examined, the combined character segments are then compared with the natural break minimum to determine if any of the combined character segments are greater than the natural break minimum. If any are greater than the natural break minimum, then the combined character segment is broken into two characters of equal width with a one scan space there between if the combined width is an odd number and a space of zero scan space if combined width is even.

The next operation is to determine which of the spaces represent voids between words rather than characters within the same word. This is the delimiter operation and proceeds by calculating a delimeter value (D) from the following formula: D=2XAVS+T, where AVS is the average space width and T is the standard deviation of the spaces, excluding spaces greater than 25.

The delimiter value (D) calculated is utilized to declare each space greater than 14 scans and also greater than the delimiter value as a void between words rather than a gap between characters. Particular design parameters may cause the above formuli to change.

Having described the invention in connection with certain specific embodiments thereof, it is to be understood that further modifications may now suggest themselves to those skilled in the art. It is intended to cover all such modifications as fall within the scope of the appended claims.

What is claimed is:

1. System for character presence detection locating characters within a line of characters represented by data bits in a binary stream which is divided into scans, at least some of said data bits corresponding to character information representing said characters, comprising:
   a plurality of scan detectors receiving said binary stream and signalling when the data bits in one scan contain character information conforming to certain criteria, each scan detector having a different criterion;
   a plurality of segment generators, each segment generator in electrical communication with one of said scan detectors for storing into a memory as a series the number of consecutive scans meeting each criteria as a character segment (C) and the number of scans between said character segments as spaces (S) in said series;
   an averaging means for selecting one series of said character segments stored within said memory as determined by the average number of data bits containing character information per scan for said line;
   arithmetic means connected to said averaging means and to said memory for deriving a recycle number based on said average number (BAV) of data bits containing character information per scan, the average scans (ACW) per character segment, and the standard deviation (SD) of the number of scans in said character segments; and
   combination means for receiving said recycle number combining adjacent character segments (CC) of the selected series and the spaces (CS) there between until the addition of another character segment exceeds said recycle number to form a series of combined character segments, said arithmetic means deriving other recycle numbers for use by said combination means utilizing said combined character segments until the recycle number derived is approximately equal to the prior recycled number derived by said arithmetic means.

2. System for character presence detection as set forth in claim 1 wherein at least four consecutive scans must meet certain criteria for said memory to store as a character segment within said storage.

3. System for character presence detection as set forth in claim 1 wherein said criteria are based on the distribution of data bits containing character information within said one scan.

4. System for character presence detection as set forth in claim 1 wherein said arithmetic means utilizes only character segments greater than eight scans to derive the recycle number.

5. System for character presence detection as set forth in claim 1 including a first detector connected to receive said binary stream for signalling the occurrence of scans without any data bits containing character information, and wherein each segment generator is operationally connected to said first detector for storing the number of scans without data bits containing character information for each space (S).

6. System for character presence detection as set forth in claim 1 wherein the recycle number (RC) is derived in accordance with the following formula:

$$RC = (10 - BAV) + ACW + SD.$$

7. System for character presence detection as set forth in claim 1 wherein each data bit occupies a unique data bit position with its particular scan and including a sneak through means connected to receive said binary stream for signalling to each segment generator the absence of any data bit position containing character information for a predetermined number of consecutive scans.

8. System for character presence detection as set forth in claim 7 wherein said predetermined number of consecutive scans includes the scan currently being received, and said predetermined number of consecutive scans is four.

9. System for character presence detection as set forth in claim 1 including means calculating a suspect character width (SCW) based on the average width (ACS) of the series of combined character segments, the standard deviation (SD) of the combined character segments, and the number (P) of combined character segments greater than ACS+SD.

10. System for character presence detection as set forth in claim 9 including means calculation, a natural break maximum (NBMAX) and minimum (NBMIN) based on the number (P), SD and ACS.

11. System for character presence detection as set forth in claim 10 wherein NBMAX and NBMIN are derived in accordance with the following formula:

$$NBMAX = (2 \times ACS) = SD - P, \text{ and}$$

$$NBMIN = (2 \times ACS) + 5 - P.$$

12. System for character presence detection as set forth in claim 11 including recovery means connected to receive SCW, NBMAX and NBMIN for forming a series of combined recovery character segments (CRC) and spaces (CRS) by determining if at least one combined character segment (CC) is greater than SCW to sum said one combined character segment with one adjacent combined character segment and the CS there between forming two CRC having approximately equal widths if the sum is within the inclusive range of NBMIN and NBMAX.

13. System for character presence detection as set forth in claim 11 wherein each combined character segment greater than NBMIN is adjusted to form two CRC of equal widths with a one scan space there between if the adjusted character is comprised of an odd number of scans.

14. System for character presence detection as set forth in claim 11 including delimiter means for declaring each space greater than a delimiter value (D) as a void between words in said line rather than gaps between characters within the same word.

15. System for character presence detection as set forth in claim 14 wherein said delimiter value (D) is in accordance with the following formula:

$$D = 2 \times AVS + T,$$

where AVS is the average space width and T is the standard deviation of the spaces, excluding spaces greater than 25 scans.

16. A system for character presence detection receiving a binary data stream comprised of data bits and divided into scans, at least some of said data bits contain character information representing a plurality of characters disposed along the line, said system forming at least one series of character (C) segments with spaces (S) there between, each scan of said character segments (C) meeting certain predetermined criteria and based on the relationships between data bits within said scan, said system forming a series of combined character segments (CC) including each of said character segments and each of said spaces (CS) there between by combining any adjacent character segments (C) and the spaces (S) there between meeting preselected conditions, comprising:

means for calculating a suspect character width (SCW) from said combined character segments (CC) in accordance with the formula: SCW=ACW+(ACW÷SD), where ACW is the average combined character width and SD is the standard deviation excluding those less than 8, means for calculating an inclusive natural break range having a minimum (NBMIN), and maximum (NBMAX) values in accordance with the following formulas: NBMAX=2×ACW+5−P, NBMIN=2×ACW−SD−P, where P represents the number of combined character segments greater than ACW+SD, means for comparing each combined character segment to the SCW to determine if any combined character segments exceed the SCW, summing means connecting to said means for comparing forming the sum of said combined character segments exceeding the SCW, one combined segment adjacent thereto, and the space there between, means for adjusting widths of the combined character segments and the spaces there between to form two combined recovery character segments of equal widths if the said sum is within the inclusive range of NBMAX and NBMIN, the total of said equal widths being approximately equal to the said sum.

17. System for character presence detection as set forth in claim 16 wherein said summing means which utilizes a prior combined character segment in said series as said one combined character segment, and wherein said summing means in response to said means for adjusting, if said sum is outside the inclusive range of NBMAX and NBMIN, to utilize a subsequent combined character segment in said series as said one combined character segment.

18. System for character presence detection as set forth in claim 16 wherein said means for adjusting forms a series of combined recovery character segments (CRC) and combined recovery spaces (CRS) which includes each combined character segment less than and equal to the suspect character width and outside the range of NBMAX and NBMIN and including means for determining spaces representing voids between words and spaces representing gaps between characters within the same word by declaring all spaces greater than 14 scans and also greater than a delimiter value D as voids in accordance with the formula: D=2×AVS+T, where AVS is the average width of the CRS and T is the standard deviation of the CRS, excluding spaces greater than 25.

19. System for character presence detection as set forth in claim 16 including means for comparing each of said combined character segments to determine if any of said combined character segments are greater than NBMIN for adjusting the combined character segment to form a pair of combined character segments having a width of approximately ½ of the width of the combined character segment.

* * * * *